United States Patent
Zama et al.

(10) Patent No.: US 11,955,640 B2
(45) Date of Patent: Apr. 9, 2024

(54) INORGANIC PARTICLE LAYER, ELECTRODE, ELECTRODE ELEMENT, AND NON-AQUEOUS ELECTROLYTE POWER STORAGE ELEMENT

(71) Applicant: RICOH COMPANY, LTD., Tokyo (JP)

(72) Inventors: Yuu Zama, Kanagawa (JP); Masahiro Masuzawa, Kanagawa (JP); Kohji Matsuoka, Kanagawa (JP); Hideo Yanagita, Tokyo (JP); Ryuji Higashi, Kanagawa (JP); Anna Hirowatari, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 590 days.

(21) Appl. No.: 17/277,140

(22) PCT Filed: Oct. 31, 2019

(86) PCT No.: PCT/JP2019/042874
§ 371 (c)(1),
(2) Date: Mar. 17, 2021

(87) PCT Pub. No.: WO2020/095824
PCT Pub. Date: May 14, 2020

(65) Prior Publication Data
US 2021/0320342 A1   Oct. 14, 2021

(30) Foreign Application Priority Data

Nov. 9, 2018 (JP) .................. 2018-211764
Aug. 7, 2019 (JP) .................. 2019-145603

(51) Int. Cl.
*H01M 4/62* (2006.01)
*H01G 11/26* (2013.01)
(Continued)

(52) U.S. Cl.
CPC ............ *H01M 4/622* (2013.01); *H01G 11/26* (2013.01); *H01M 4/13* (2013.01); *H01M 4/62* (2013.01);
(Continued)

(58) Field of Classification Search
None
See application file for complete search history.

(56) References Cited

U.S. PATENT DOCUMENTS

2009/0305141 A1   12/2009   Lee et al.
2010/0055564 A1†   3/2010   Tokunaga
(Continued)

FOREIGN PATENT DOCUMENTS

CN   101662015   3/2010
CN   105531854   4/2016
(Continued)

OTHER PUBLICATIONS

Machine translation of JP-2011190405-A. (Year: 2011).*
(Continued)

*Primary Examiner* — Gregg Cantelmo
(74) *Attorney, Agent, or Firm* — Grüneberg and Myers PLLC

(57) ABSTRACT

An inorganic particle layer for use in an electrode of a non-aqueous electrolyte power storage element is provided. The inorganic particle layer includes an inorganic particle and a polymer. The inorganic particle is insulating and has a surface potential. The polymer has an ionic functional group (A) and an ion-conducting functional group (B) each charged opposite to the surface potential of the inorganic particle. The inorganic particle and the polymer are bonded to each other.

17 Claims, 27 Drawing Sheets

(51) Int. Cl.
   *H01M 4/02* (2006.01)
   *H01M 4/13* (2010.01)
   *H01M 10/0525* (2010.01)
(52) U.S. Cl.
   CPC .. *H01M 2004/021* (2013.01); *H01M 10/0525* (2013.01)

(56) References Cited

U.S. PATENT DOCUMENTS

| | | |
|---|---|---|
| 2013/0244116 A1† | 9/2013 | Watanabe |
| 2013/0309566 A1 | 11/2013 | Umehara |
| 2014/0065489 A1 | 3/2014 | Saimen et al. |
| 2017/0084903 A1 | 3/2017 | Umehara |
| 2017/0092930 A1† | 3/2017 | Chae |
| 2018/0261827 A1 | 9/2018 | Yanagita et al. |
| 2019/0288276 A1 | 9/2019 | Utsuki et al. |

FOREIGN PATENT DOCUMENTS

| | | | |
|---|---|---|---|
| CN | 108305972 | | 7/2018 |
| JP | 2004-273281 | | 9/2004 |
| JP | 2007-217482 | | 8/2007 |
| JP | 2010055755 | | 3/2010 |
| JP | 2010-160984 | | 7/2010 |
| JP | 2011190405 A | * | 9/2011 |
| JP | 2013191550 | | 9/2013 |
| JP | 2013-251073 | | 12/2013 |
| JP | 2014-143152 | | 8/2014 |
| JP | 5708872 | | 4/2015 |
| JP | 2015-518644 A | | 7/2015 |
| JP | 2016-058241 A | | 4/2016 |
| JP | 2017-004960 A | | 1/2017 |
| JP | 2018-113125 | | 7/2018 |
| JP | 2018-133297 | | 8/2018 |
| KR | 10-2007-0092621 | | 9/2007 |
| KR | 10-2011-0119264 | | 11/2011 |
| KR | 10-2016-0061317 | | 5/2016 |
| KR | 20160061317 A | † | 5/2016 |
| KR | 20170034725 | | 3/2017 |
| WO | 2014/049949 | | 4/2014 |
| WO | WO 2014/182063 A1 | | 11/2014 |
| WO | 2015/046191 | | 4/2015 |
| WO | WO-2018164076 A1 | * | 9/2018 ........ H01M 10/0525 |

OTHER PUBLICATIONS

Malialim series—NOF America Corporation online disclosure (https://www.nofamerica.com/store/index.php?dispatch=categories.view&category_id=131), date unknown. (Year: Unknown).*
Japanese Office Action dated Mar. 28, 2023, in Japanese Patent Application No. 2019-145603, 5 pages.
Chinese Office Action dated Jul. 1, 2023, in Chinese Patent Application No. 201980071073.0, 8 pages.
Chinese Office Action dated Sep. 2, 2022, in Chinese Application No. 201980071073.0, 7 pages.
Japanese Office Action dated Aug. 29, 2023, in Japanese Application No. 2019-145603, 4 pages.
Korean Office Action dated Sep. 18, 2023, in Korean Application No. 10-2021-7014485, with English translation, 13 pages.
Korean Notice of Submission of Third-Party Observation dated May 20, 2022, in Korean Application No. 10-2021-7014485, 2 pages.
International Search Report and Written Opinion dated Mar. 11, 2020 in PCT/JP2019/042874 filed on Oct. 31, 2019.
Tsung-yuan Chen, et al., "Preparation of Novel Core-Shell Nanocomposite Particles by Controlled Polymer Bridging," Journal of the American Ceramic Society, vol. 81, Issue 1, 1998, pp. 140-141.
Frank Caruso, et al., "Investigation of Electrostatic Interactions in Polyelectrolyte Multilayer Films: Binding of Anionic Fluorescent Probes to Layers Assembled onto Colloids," Macromolecules, vol. 32, 1999, pp. 2317-2328.

\* cited by examiner
† cited by third party

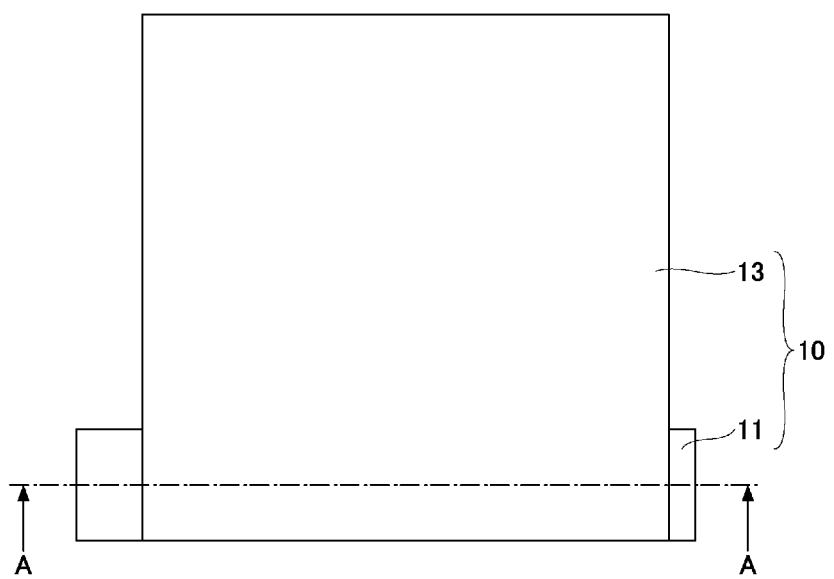

FIG. 15

| | PROPORTION OF POLYMER TO INORGANIC PARTICLE IN INORGANIC PARTICLE LAYER (% BY MASS) | PROPORTION OF BINDER TO INORGANIC PARTICLE IN INORGANIC PARTICLE LAYER (% BY MASS) | EVALUATION 1 RESULT (%) *WITH RESPECT TO EXAMPLE 1 (100%) | EVALUATION 2 RESULT (%) *WITH RESPECT TO EXAMPLE 1 (100%) | EVALUATION 1 JUDGEMENT | EVALUATION 2 JUDGEMENT |
|---|---|---|---|---|---|---|
| EXAMPLE 1 | 2.25 | 0 | 100 | 100 | GOOD | GOOD |
| EXAMPLE 2 | 1.0 | 0 | 99 | 80 | GOOD | GOOD |
| EXAMPLE 3 | 0.5 | 0 | 100 | 75 | GOOD | GOOD |
| EXAMPLE 4 | 3.0 | 0 | 95 | 110 | GOOD | GOOD |
| EXAMPLE 5 | 4.0 | 0 | 90 | 130 | GOOD | GOOD |
| EXAMPLE 6 | 5.0 | 0 | 85 | 150 | GOOD | GOOD |

FIG. 16

| | PROPORTION OF POLYMER TO INORGANIC PARTICLE IN INORGANIC PARTICLE LAYER (% BY MASS) | PROPORTION OF BINDER TO INORGANIC PARTICLE IN INORGANIC PARTICLE LAYER (% BY MASS) | EVALUATION 1 RESULT (%) *WITH RESPECT TO EXAMPLE 1 (100%) | EVALUATION 2 RESULT (%) *WITH RESPECT TO EXAMPLE 1 (100%) | EVALUATION 1 JUDGEMENT | EVALUATION 2 JUDGEMENT |
|---|---|---|---|---|---|---|
| EXAMPLE 1 | 2.25 | 0 | 100 | 100 | GOOD | GOOD |
| COMPARATIVE EXAMPLE 1 | 0 | 1.0 | 52 | 120 | POOR | GOOD |

FIG. 17

| | PROPORTION OF POLYMER TO INORGANIC PARTICLE IN INORGANIC PARTICLE LAYER (% BY MASS) | PROPORTION OF BINDER TO INORGANIC PARTICLE IN INORGANIC PARTICLE LAYER (% BY MASS) | EVALUATION 1 RESULT (%) *WITH RESPECT TO EXAMPLE 1 (100%) | EVALUATION 1 JUDGEMENT | EVALUATION 2 RESULT (%) *WITH RESPECT TO EXAMPLE 1 (100%) | EVALUATION 2 JUDGEMENT |
|---|---|---|---|---|---|---|
| EXAMPLE 3 | 0.5 | 0 | 100 | GOOD | 100 | GOOD |
| COMPARATIVE EXAMPLE 2 | 0.4 | 0 | 101 | GOOD | 60 | POOR |

FIG. 18

| | PROPORTION OF POLYMER TO INORGANIC PARTICLE IN INORGANIC PARTICLE LAYER (% BY MASS) | PROPORTION OF BINDER TO INORGANIC PARTICLE IN INORGANIC PARTICLE LAYER (% BY MASS) | EVALUATION 1 RESULT (%) *WITH RESPECT TO EXAMPLE 1 (100%) | EVALUATION 2 RESULT (%) *WITH RESPECT TO EXAMPLE 1 (100%) | EVALUATION 1 JUDGEMENT | EVALUATION 2 JUDGEMENT |
|---|---|---|---|---|---|---|
| EXAMPLE 6 | 5.0 | 0 | 100 | 100 | GOOD | GOOD |
| COMPARATIVE EXAMPLE 3 | 6.0 | 0 | 67 | 165 | POOR | GOOD |

FIG. 19

| | PROPORTION OF POLYMER TO INORGANIC PARTICLE IN INORGANIC PARTICLE LAYER (% BY MASS) | PROPORTION OF BINDER TO INORGANIC PARTICLE IN INORGANIC PARTICLE LAYER (% BY MASS) | EVALUATION 1 RESULT (%) *WITH RESPECT TO EXAMPLE 1 (100%) | EVALUATION 2 RESULT (%) *WITH RESPECT TO EXAMPLE 1 (100%) | EVALUATION 1 JUDGEMENT | EVALUATION 2 JUDGEMENT |
|---|---|---|---|---|---|---|
| EXAMPLE 7 | 1.5 | 0.1 | 91 | 95 | GOOD | GOOD |
| EXAMPLE 8 | 1.0 | 0.2 | 82 | 85 | GOOD | GOOD |
| EXAMPLE 9 | 0.5 | 0.25 | 74 | 78 | GOOD | GOOD |
| EXAMPLE 10 | 0.2 | 0.3 | 71 | 75 | GOOD | GOOD |

FIG. 20

| | PROPORTION OF POLYMER TO INORGANIC PARTICLE IN INORGANIC PARTICLE LAYER (% BY MASS) | PROPORTION OF BINDER TO INORGANIC PARTICLE IN INORGANIC PARTICLE LAYER (% BY MASS) | EVALUATION 1 RESULT (%) *WITH RESPECT TO EXAMPLE 1 (100%) | EVALUATION 2 RESULT (%) *WITH RESPECT TO EXAMPLE 1 (100%) | EVALUATION 1 JUDGEMENT | EVALUATION 2 JUDGEMENT |
|---|---|---|---|---|---|---|
| EXAMPLE 1 | 2.25 | 0 | 100 | 100 | GOOD | GOOD |
| COMPARATIVE EXAMPLE 1 | 0 | 1.0 | 52 | 120 | POOR | GOOD |
| COMPARATIVE EXAMPLE 4 | 0 | 1.5 | 40 | 150 | POOR | GOOD |
| COMPARATIVE EXAMPLE 5 | 0 | 0.5 | 64 | 80 | POOR | GOOD |
| COMPARATIVE EXAMPLE 6 | 0 | 0.4 | 70 | 68 | GOOD | POOR |

FIG. 21

| | WEIGHT PER UNIT AREA OF INORGANIC PARTICLE LAYER (mg/cm²) | PROPORTION OF POLYMER TO INORGANIC PARTICLE IN INORGANIC PARTICLE LAYER (% BY MASS) | PROPORTION OF BINDER TO INORGANIC PARTICLE IN INORGANIC PARTICLE LAYER (% BY MASS) | EVALUATION 1 RESULT (%) *WITH RESPECT TO EXAMPLE 1 (100%) | EVALUATION 2 RESULT (%) *WITH RESPECT TO EXAMPLE 1 (100%) | EVALUATION 1 JUDGEMENT | EVALUATION 2 JUDGEMENT |
|---|---|---|---|---|---|---|---|
| EXAMPLE 1 | 1.3 | 2.25 | 0 | 100 | 100 | GOOD | GOOD |
| EXAMPLE 11 | 0.8 | 2.25 | 0 | 101.5 | 98 | GOOD | GOOD |
| EXAMPLE 12 | 0.6 | 2.25 | 0 | 101 | 101 | GOOD | GOOD |
| EXAMPLE 13 | 2.6 | 2.25 | 0 | 98 | 99 | GOOD | GOOD |
| EXAMPLE 14 | 5.0 | 2.25 | 0 | 96 | 103 | GOOD | GOOD |

FIG. 22

| | TYPE OF POLYMER IN INORGANIC PARTICLE LAYER | PROPORTION OF POLYMER TO INORGANIC PARTICLE IN INORGANIC PARTICLE LAYER (% BY MASS) | PROPORTION OF BINDER TO INORGANIC PARTICLE IN INORGANIC PARTICLE LAYER (% BY MASS) | EVALUATION 1 RESULT (%) *WITH RESPECT TO EXAMPLE 1 (100%) | EVALUATION 2 RESULT (%) *WITH RESPECT TO EXAMPLE 1 (100%) | EVALUATION 1 JUDGEMENT | EVALUATION 2 JUDGEMENT |
|---|---|---|---|---|---|---|---|
| EXAMPLE 1 | MALIALIM™ HKM-50A | 2.25 | 0 | 100 | 100 | GOOD | GOOD |
| EXAMPLE 15 | POLYMER DISPERSANT 1 | 2.25 | 0 | 97 | 98 | GOOD | GOOD |
| EXAMPLE 16 | POLYMER DISPERSANT 2 | 2.25 | 0 | 86 | 105 | GOOD | GOOD |
| EXAMPLE 17 | POLYMER DISPERSANT 3 | 2.25 | 0 | 88 | 78 | GOOD | GOOD |
| EXAMPLE 18 | POLYMER DISPERSANT 4 | 2.25 | 0 | 103 | 83 | GOOD | GOOD |
| EXAMPLE 19 | POLYMER DISPERSANT 5 | 2.25 | 0 | 81 | 102 | GOOD | GOOD |
| EXAMPLE 20 | POLYMER DISPERSANT 6 | 2.25 | 0 | 94 | 99 | GOOD | GOOD |
| EXAMPLE 21 | POLYMER DISPERSANT 7 | 2.25 | 0 | 85 | 72 | GOOD | GOOD |

INORGANIC PARTICLE LAYER, ELECTRODE, ELECTRODE ELEMENT, AND NON-AQUEOUS ELECTROLYTE POWER STORAGE ELEMENT

TECHNICAL FIELD

The present disclosure relates to an inorganic particle layer, an electrode, an electrode element, and a non-aqueous electrolyte power storage element.

BACKGROUND ART

In recent years, power storage elements (e.g., batteries) and power generating elements (e.g., fuel cells) have been rapidly increasing in energy density. A battery having a high energy density gets into an abnormal state (e.g., rupture, ignition) when gets contaminated by foreign matter or receives external impact. Thus, ensuring the safety of the battery is an issue.

One factor of rupture or ignition is Joule heat generated by an internal short circuit or an external short circuit, which causes the battery materials to continuously undergo an abnormal reaction to cause ignition or thermal runaway.

As a technique for reducing Joule heat generated by an internal short circuit or an external short circuit, an electrode for a sheet-type secondary battery has been proposed in which an inorganic particle layer containing inorganic particles and a binder polymer is formed on an electrode composite layer (for example, see Patent Document 1).

CITATION LIST

Patent Literature

PTL 1: Japanese Translation of PCT International Application Publication No. 2015-518644

SUMMARY OF INVENTION

Technical Problem

The above-described electrode needs to contain about 10% by mass of the binder in the inorganic particle layer to make the inorganic particle layer isolated in a sheet form. When the binder is a typical binder, binding of the inorganic particles is ensured. At the same time, the binder soaks into the electrode composite layer and covers active materials, thereby inhibiting ionic conductivity of the inorganic particle layer to reduce characteristics (input/output characteristics) of the battery.

The present invention has been achieved in view of the above-described situation. One object of the present invention is to provide an inorganic particle layer that ensures binding of inorganic particles and improves characteristics of a non-aqueous electrolyte power storage element when used for the electrode of the non-aqueous electrolyte power storage element.

Solution to Problem

An embodiment of the present invention provides an inorganic particle layer for use in an electrode of a non-aqueous electrolyte power storage element. The inorganic particle layer includes an inorganic particle and a polymer. The inorganic particle is insulating and has a surface potential. The polymer has an ionic functional group (A) and an ion-conducting functional group (B) each charged opposite to the surface potential of the inorganic particle. The inorganic particle and the polymer are bonded to each other.

Advantageous Effects of Invention

In accordance with an embodiment of the present invention, an inorganic particle layer is provided that reliably provides a binding force between inorganic particles and improves characteristics of a non-aqueous electrolyte power storage element when used for the electrode of the non-aqueous electrolyte power storage element.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

FIGS. 1A and 1B are diagrams illustrating an anode for use in a non-aqueous electrolyte power storage element according to the first embodiment.

FIG. 15 is a table showing the results of Examples 1 to 6.

FIG. 16 is a table showing the results of Example 1 and Comparative Example 1.

FIG. 17 is a table showing the results of Example 3 and Comparative Example 2.

FIG. 18 is a table showing the results of Example 6 and Comparative Example 3.

FIG. 19 is a table showing the results of Examples 7 to 10.

FIG. 20 is a table showing the results of Example 1, Comparative Example 1, and Comparative Examples 4 to 6.

FIG. 21 is a table showing the results of Example 1 and Examples 11 to 14.

FIG. 22 is a table showing the results of Example 1 and Examples 15 to 21.

DESCRIPTION OF EMBODIMENTS

Figure 1B:
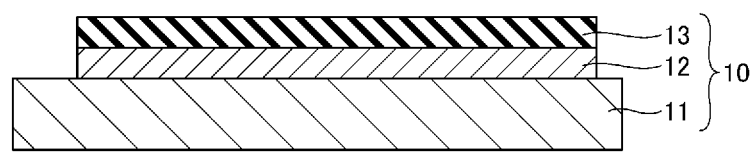

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

Within the context of the present disclosure, if a first layer is stated to be "overlaid" or "underlaid" on, or "overlying" or "underlying" a second layer, the first layer may be in direct contact with a portion or all of the second layer, or there may be one or more intervening layers between the first and second layer.

Embodiments of the present invention are described in detail below with reference to the drawings. In each drawing, the same reference numerals are given to the same components, and redundant explanation may be omitted.

First Embodiment

FIG. 1A is a plan view of an anode for use in a non-aqueous electrolyte power storage element according to a first embodiment. FIG. 1B is a cross-sectional view of the anode illustrated in FIG. 1A taken along a dotted line A-A.

Referring to FIGS. 1A and 1B, an anode 10 includes an anode substrate 11, an anode composite layer 12 formed on the anode substrate 11, and an inorganic particle layer 13 formed on the anode composite layer 12. The shape of the anode 10 is not particularly limited and can be suitably selected to suit to a particular application. For example, the anode 10 may be in a flat-plate form.

Figure 2A:
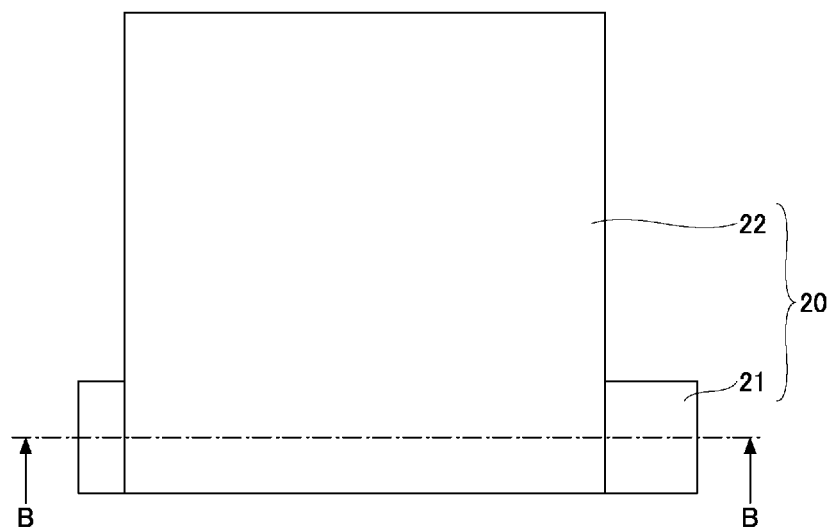
FIGS. 2A and 2B are diagrams illustrating a cathode for use in the non-aqueous electrolyte power storage element according to the first embodiment.
Figure 2B:
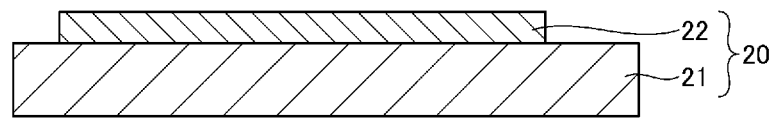

FIG. 2A is a plan view of a cathode for use in the non-aqueous electrolyte power storage element according to the first embodiment. FIG. 2B is a cross-sectional view of the cathode illustrated in FIG. 2A taken along a dotted line B-B. Referring to FIGS. 2A and 2B, a cathode 20 includes a cathode substrate 21 and a cathode composite layer 22 formed on the cathode substrate 21. The shape of the cathode 20 is not particularly limited and can be suitably selected to suit to a particular application. For example, the cathode 20 may be in a flat-plate form.

Figure 3:
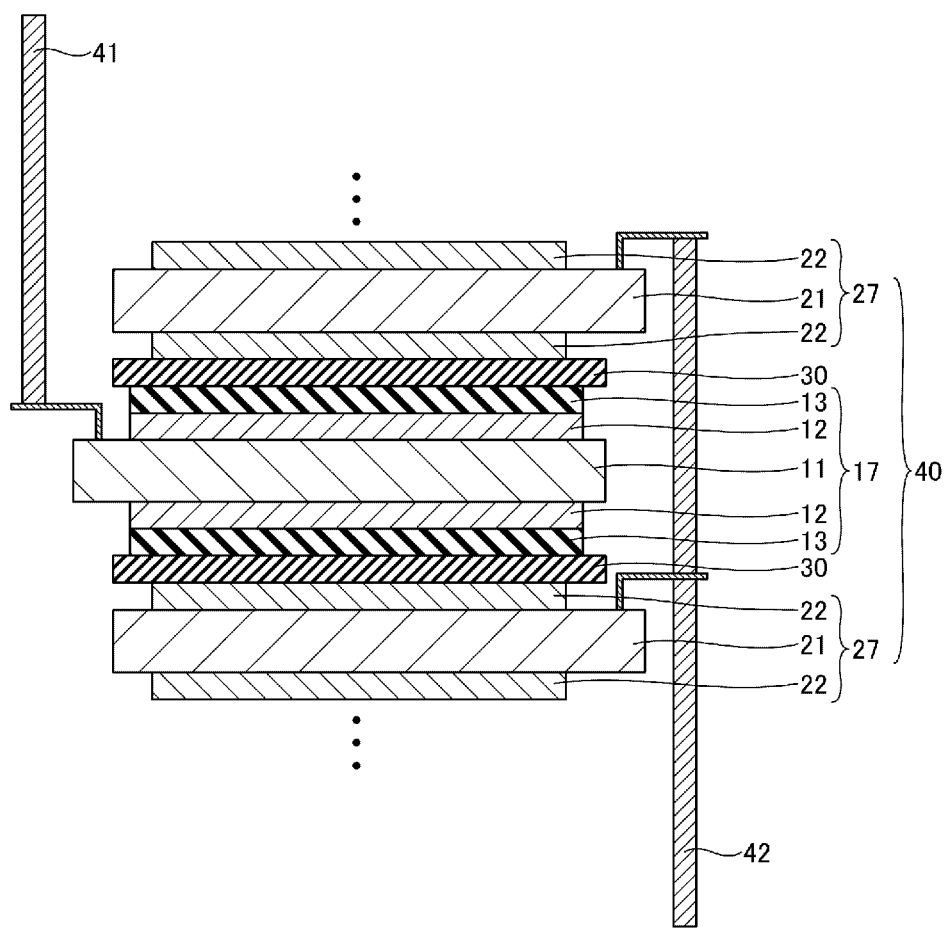
FIG. 3 is a cross-sectional view of an electrode element for use in the nonaqueous electrolyte power storage element according to the first embodiment.

FIG. 3 is a cross-sectional view of an electrode element for use in the non-aqueous electrolyte power storage element according to the first embodiment. Referring to FIG. 3, an electrode element 40 has a structure in which an anode 17 and a cathode 27 are stacked in alternating and insulating manners with a separator 30 interposed therebetween. In the electrode element 40, the cathode 27 is stacked on both sides of the anode 17. An anode lead wire 41 is connected to the anode substrate 11. A cathode lead wire 42 is connected to the cathode substrate 21.

The anode 17 is the same as the anode 10 (illustrated in FIGS. 1A and 1B) except that the anode composite layer 12 and the inorganic particle layer 13 are formed on both sides of the anode substrate 11. The cathode 27 is the same as the cathode 20 (illustrated in FIGS. 2A and 2B) except that the cathode composite layer 22 is formed on both sides of the cathode substrate 21.

The number of the anodes 17 and the cathodes 27 stacked in the electrode element 40 can be arbitrarily determined. As an example, the embodiment illustrated in FIG. 3 includes one anode 17 and two cathodes 27, i.e., three layers in total. The number of the stacked layers is not limited to this, and more anodes 17 and cathodes 27 can be stacked. In such cases, the number of the anodes 17 and the number of the cathodes 27 may be the same.

Figure 4:
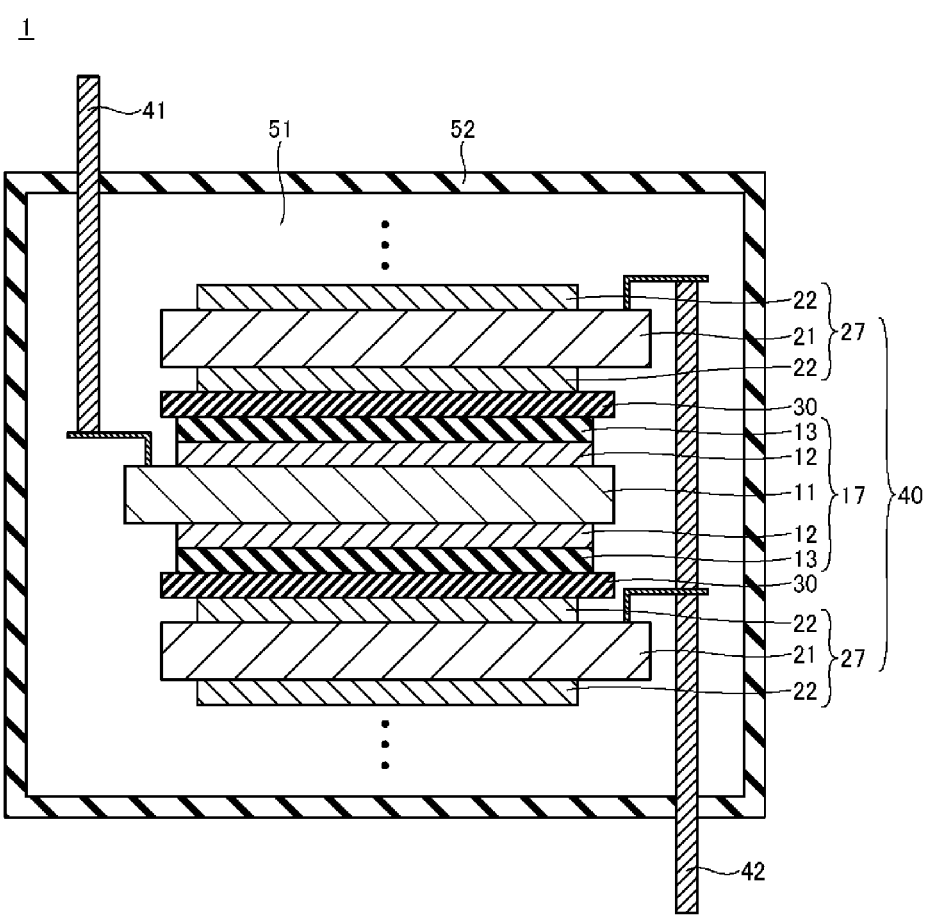
FIG. 4 is a cross-sectional view of the non-aqueous electrolyte power storage element according to the first embodiment.

FIG. 4 is a cross-sectional view of the non-aqueous electrolyte power storage element according to the first embodiment. Referring to FIG. 4, a non-aqueous electrolyte power storage element 1 has a structure in which an electrolyte layer 51 is formed by injecting a non-aqueous electrolyte into the electrode element 40 and sealed with an exterior 52. In the non-aqueous electrolyte power storage element 1, the anode lead wire 41 and the cathode lead wire 42 are drawn out of the exterior 52. The nonaqueous electrolyte power storage element 1 may further include other members, as necessary. The non-aqueous electrolyte power storage element 1 is not particularly limited and can be suitably selected to suit to a particular application. Examples thereof include, but are not limited to, a non-aqueous electrolyte secondary battery and a nonaqueous electrolyte capacitor.

The shape of the non-aqueous electrolyte power storage element 1 is not particularly limited and can be suitably selected from various generally-employed shapes to suit to a particular application. For example, the shape may be of a laminate type, a cylinder type in which a sheet electrode and a separator are assembled in a spiral manner, another cylinder type in which a pellet electrode and a separator are combined into an inside-out structure, or a coin type in which a pellet electrode and a separator are laminated.

The non-aqueous electrolyte power storage element 1 is described in detail below. In the following descriptions, the anode and the cathode may be collectively referred to as "electrode", the anode substrate and the cathode substrate may be collectively referred to as "electrode substrate", and the anode composite layer and the cathode composite layer may be collectively referred to as "electrode composite layer".

Electrode

Electrode Substrate

The material of the anode substrate 11 is not particularly limited and can be suitably selected to suit to a particular application as long as it is formed of a conductive material. Examples thereof include, but are not limited to, stainless steel, nickel, aluminum, and copper. Among these, stainless steel and copper are particularly preferable.

The shape of the anode substrate 11 is not particularly limited and can be suitably selected to suit to a particular application. The size of the anode substrate 11 is not particularly limited and can be suitably selected to suit to a particular application as long as the anode substrate 11 can be used for the non-aqueous electrolyte power storage element 1 in terms of size.

The material of the cathode substrate 21 is not particularly limited and can be suitably selected to suit to a particular application as long as it is formed of a conductive material. Examples thereof include, but are not limited to, stainless steel, nickel, aluminum, copper, titanium, and tantalum. Among these, stainless steel and aluminum are particularly preferable.

The shape of the cathode substrate 21 is not particularly limited and can be suitably selected to suit to a particular application. The size of the cathode substrate 21 is not particularly limited and can be suitably selected to suit to a particular application as long as the cathode substrate 21 can be used for the non-aqueous electrolyte power storage element 1 in terms of size.

Electrode Composite Layer

The anode composite layer 12 and the cathode composite layer 22 are not particularly limited and can be suitably selected to suit to a particular application. For example, the anode composite layer 12 and the cathode composite layer 22 may contain at least an active material (an anode active material or a cathode active material) and optionally a binder, a thickener, a conducting agent, or the like.

The anode composite layer 12 may be formed by applying an anode material composition in a slurry state onto the anode substrate 11, followed by drying. Here, the anode material composition may be prepared by adding a binder, a thickener, a conducting agent, a solvent, and the like, to an anode active material. The cathode composite layer 22 may be formed in the same manner.

The average thickness of the anode composite layer 12 is not particularly limited and can be suitably selected to suit to a particular application. Preferably, the average thickness of the anode composite layer 12 is from 10 to 450 μm, and more preferably, from 20 to 100 μm. When the average thickness of the anode composite layer 12 is less than 10 μm, the energy density may be lowered. When the average thickness of the anode composite layer 12 is more than 450 μm, the cycle characteristics may be degraded.

The anode active material contained in the anode composite layer 12 is not particularly limited as long as it is a material capable of reversibly occluding and releasing alkali metal ions such as lithium ion. Examples of the anode active material contained in the anode composite layer 12 include, but are not limited to, a carbonaceous material. Examples of the carbonaceous material include, but are not limited to, coke, graphites such as synthetic graphite and natural graphite, pyrolysis products of organic matter under various pyrolysis conditions, and amorphous carbon. Among these, synthetic graphite, natural graphite, and amorphous carbon are particularly preferable.

The average thickness of the cathode composite layer 22 is not particularly limited and can be suitably selected to suit to a particular application. Preferably, the average thickness of the cathode composite layer 22 is from 10 to 300 μm, and more preferably, from 40 to 150 μm. When the average thickness of the cathode composite layer 22 is less than 10 μm, the energy density may be lowered. When the average thickness of the cathode composite layer 22 is more than 300 μm, the load characteristics may be degraded.

The cathode active material contained in the cathode composite layer 22 is not particularly limited as long as it is a material capable of reversibly occluding and releasing alkali metal ions such as lithium ion. Examples of the cathode active material contained in the cathode composite layer 22 include, but are not limited to, an alkali-metal-containing transition metal compound.

Examples of the alkali-metal-containing transition metal compound include, but are not limited to, lithium-nickel composite oxides represented by $LiNi_xCo_yMn_zO_2$ (where $x+y+z=1$ is satisfied) and lithium phosphate materials having a base backbone represented by $Li_xMe_y(PO_4)$, (where Me represents a transition metal, and $0.5 \leq x \leq 4$, $0.5 \leq y \leq 2.5$, and 0.5 z 3.5 are satisfied).

Examples of the lithium-nickel composite oxides represented by $LiNi_xCo_yMn_zO_2$ (where $x+y+z=1$ is satisfied) include, but are not limited to, $LiNi_{0.33}Co_{0.33}Mn_{0.33}O_2$, $LiNi_{0.5}Co_{0.2}Mn_{0.3}O_2$, $LiNi_{0.6}Co_{0.2}Mn_{0.2}O_2$, and $LiNi_{0.5}Co_{0.2}Mn_0O_2$.

Examples of the lithium phosphate materials having a base backbone represented by $Li_xMe_y(PO_4)$, (where Me represents a transition metal, and $0.5 \leq x \leq 4$, $0.5 \leq y \leq 2.5$, and $0.5 \leq z \leq 3.5$ are satisfied) include, but are not limited to, lithium vanadium phosphate ($Li_3V_2(PO_4)_3$), olivine iron ($LiFePO_4$), olivine manganese ($LiMnPO_4$), olivine cobalt ($LiCoPO_4$), olivine nickel ($LiNiPO_4$), olivine vanadium ($LiVOPO_4$), and similar compounds thereof having the same base backbone and doped with a foreign element.

Examples of the binder of the anode or cathode include, but are not limited to, polyvinylidene fluoride (PVDF), polytetrafluoroethylene (PTFE), polyethylene, polypropylene, aramid resin, polyamide, polyimide, polyamideimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulfone, hexafluoropolypropylene, styrene butadiene rubber (SBR), and carboxymethyl cellulose.

Examples of the binder further include copolymers of two or more materials selected from tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene. In addition, mixtures of two or more materials selected from these materials may also be used.

Examples of the conducting agent contained in the electrode composite layer include, but are not limited to, graphites such as natural graphite and synthetic graphite; carbon blacks such as acetylene black, Ketjen black, channel black, furnace black, lamp black, and thermal black; conductive fibers such as carbon fibers and metal fibers; carbon fluoride; powders of metals such as aluminum; conductive whiskers such as zinc oxide and potassium titanate; conductive metal oxides such as titanium oxide; and organic conductive materials such as phenylene derivatives and graphene derivatives.

Generally, in fuel cells, the active material serves as a catalyst for the cathode or the anode. The catalyst comprises catalyst particles (e.g., fine particles of a metal such as platinum, ruthenium, and platinum alloy) supported on a catalyst carrier (e.g., carbon). The catalyst particles can be made supported on the surface of the catalyst carrier by suspending the catalyst carrier in water, then adding precursors of the catalyst particles thereto to make them dissolved in the suspension, and further adding an alkali to produce a hydroxide of the metal. Here, specific examples of the precursors of the catalyst particles include, but are not limited to, chloroplatinic acid, dinitrodiamino platinum, platinum(IV) chloride, platinum(II) chloride, bisacetylacetonatoplatinum, dichlorodiammine platinum, dichlorotetramine platinum, platinum sulfate chlororuthenate, hexachloroiridate, hexachlororhodate, ferric chloride, cobalt chloride, chromium chloride, gold chloride, silver nitrate, rhodium nitrate, palladium chloride, nickel nitrate, iron sulfate, and copper chloride. The catalyst carrier is then applied onto the electrode substrate and reduced under a hydrogen atmosphere or the like, thus preparing an electrode composite layer the surface of which is coated with the catalyst particles (active material).

In solar cells, the active material may be tungsten oxide powder, titanium oxide powder, or a semiconductor layer of an oxide (e.g., $SnO_2$, $ZnO$, $ZrO_2$, $Nb_2O_5$, $CeO_2$, $SiO_2$, and $Al_2O_3$) carrying a dye (e.g., ruthenium-tris transition metal complex, ruthenium-bis transition metal complex, osmium-tris transition metal complex, osmium-bis transition metal complex, ruthenium-cis-diaqua-bipyridyl complex, phthalocyanine and porphyrin, and organic-inorganic perovskite crystal).

The following description demonstrates, as an example, a case in which the alkali metal ion is lithium ion.

Inorganic Particle Layer

Figure 5:
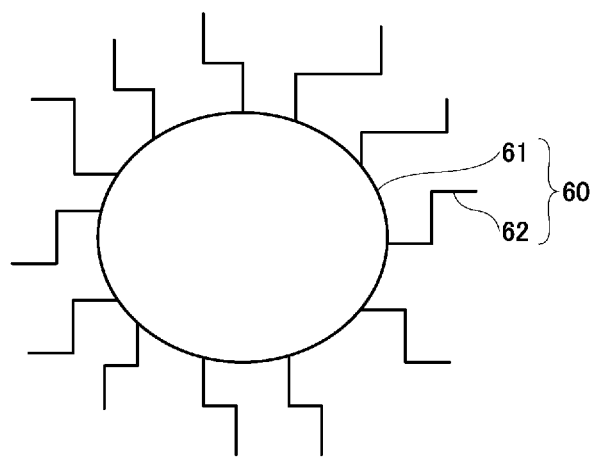
FIG. 5 is a diagram illustrating a core-shell structure of an inorganic particle and a polymer according to the first embodiment.

The inorganic particle layer 13 contains a core-shell structure 60 illustrated in FIG. 5. The core-shell structure 60 comprises an inorganic particle 61 being insulating and having a surface potential and a polymer 62 bonded to the inorganic particle 61. The polymer 62 has an ionic functional group charged opposite to the surface potential of the inorganic particle 61 and an ion-conducting functional group charged opposite to the surface potential of the inorganic particle 61. The polymer 62, charged opposite to the surface potential of the inorganic particle 61, is bonded to the inorganic particle 61 by ionic interaction to form the core-shell structure 60. In the core-shell structure 60, the inorganic particle 61 serves as the core and the polymer 62 serves as the shell. In the present disclosure, the core-shell structure 60 may also be referred to as "core-shell particle", and both are synonymous.

Here, the surface potential of the inorganic particle 61 refers to the potential of the surface of the inorganic particle 61 in a solution. In the present disclosure, the surface potential of the inorganic particle 61 is synonymous with the potential (i.e., zeta potential) of the "slip surface" at which liquid flow starts to occur in an electric double layer formed around the inorganic particle 61 in the solution. The surface potential of the inorganic particle 61 is sufficient if the inorganic particle 61 is able to form the core-shell structure 60 by ionic interaction with the polymer 62.

When the film thickness of the shell in the core-shell structure 60 is too small, the peel strength is insufficient. When the film thickness of the shell in the core-shell structure 60 is too large, the gap between the inorganic particles 61 is filled with the polymer 62, so that permeation of the electrolyte and ion permeability may be inhibited. Accordingly, although the film thickness of the shell in the core-shell structure 60 is not particularly limited, it is preferable that the film thickness of the shell be appropriately selected so that a sufficient peel strength is exerted without inhibiting permeation of the electrolyte.

The film thickness of the shell can be determined by observing the shell with a transmission electron microscope (TEM), a scanning electron microscope (SEM), or a scanning transmission electron microscope (STEM). However, a preferred film thickness of the shell in the core-shell structure 60 is often below the observation limit. Therefore, it is difficult to strictly define the film thickness of the shell.

Accordingly, in the present disclosure, an amount of adsorption of one layer is defined as follows. First, core-shell particles are prepared in each of which the ratio between the insulating inorganic particle 61 and the polymer 62 (hereinafter simply "polymer") is different, and the zeta potential or viscosity of these core-shell particles are measured. Measurement of the zeta potential results in, for example, a graph illustrated in FIG. 6. Measurement of the viscosity results in, for example, a graph illustrated in FIG. 7. The amount of adsorption of one layer is represented by the amount B of polymer at which the zeta potential reached the local maximum in the polarity side opposite to the inorganic particle 61 as in FIG. 6 or the viscosity reached the local minimum as in FIG. 7.

In the core-shell structure 60, the upper limit of the amount of adsorption of the polymer 62 to the surface of the inorganic particle 61 is not particularly limited, but is preferably equal to or less than the amount of adsorption of one layer. In other words, in the core-shell structure 60, the upper limit of the amount of adsorption of the polymer 62 to the surface of the inorganic particle 61 is not particularly limited, but is preferably equal to or less than the amount B of polymer at which the zeta potential reached the local maximum in the polarity side opposite to the inorganic particle 61 as in FIG. 6 or the viscosity reached the local minimum as in FIG. 7.

Figure 6:
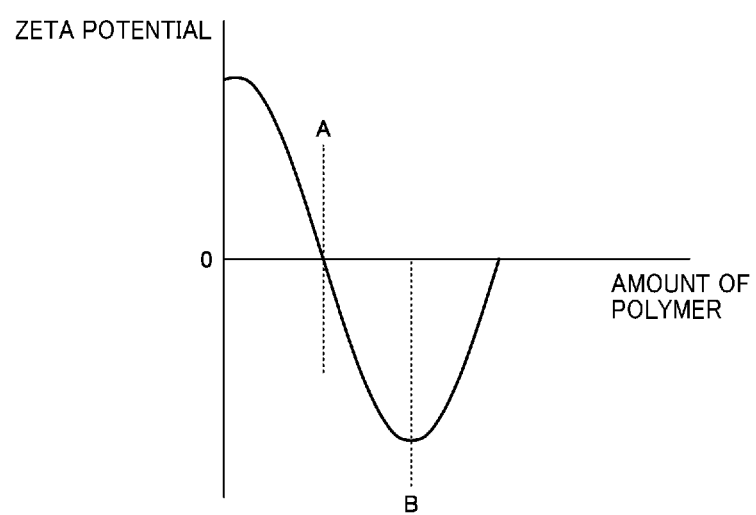
FIG. 6 is a diagram illustrating a measurement result of the zeta potential of the core-shell structure according to the first embodiment.
Figure 7:
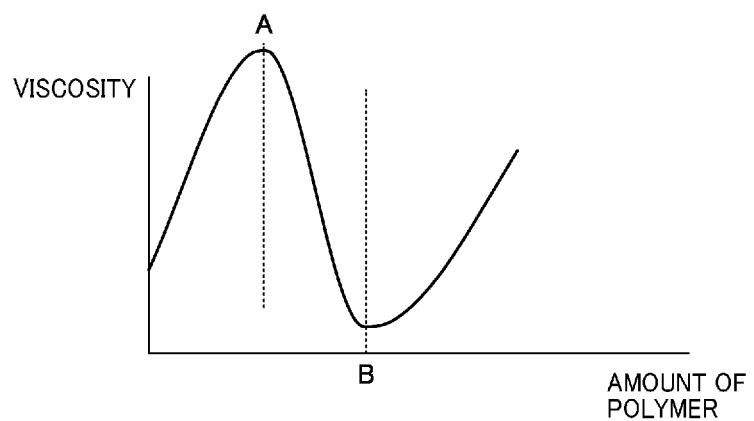
FIG. 7 is a diagram illustrating a measurement result of the viscosity of the coreshell structure according to the first embodiment.

The amount A of polymer at which the zeta potential is 0 mV as in FIG. 6 or the viscosity reached the local maximum as in FIG. 7 may result in insufficient surface coating of the inorganic particle 61. Therefore, in the core-shell structure 60, the lower limit of the amount of adsorption of the polymer 62 to the surface of the inorganic particle 61 is not particularly limited, but is preferably equal to or more than the amount A of polymer at which the zeta potential is 0 mV as in FIG. 6 or the viscosity reached the local maximum as in FIG. 7.

Accordingly, in the core-shell structure 60, the upper limit and the lower limit of the amount of adsorption of the polymer 62 to the surface of the inorganic particle 61 are not particularly limited. However, preferably, the amount of adsorption of the polymer 62 is equal to or more than the amount A of polymer at which the zeta potential is 0 mV as in FIG. 6 or the viscosity reached the local maximum as in FIG. 7, and at the same time, is equal to or less than the amount B of polymer at which the zeta potential reached the local maximum in the polarity side opposite to the inorganic particle 61 as in FIG. 6 or the viscosity reached the local minimum as in FIG. 7. In this case, the core-shell structure 60 achieves sufficient peel strength and sufficient ion permeability without inhibiting permeation of the electrolyte.

Examples of the inorganic particle 61 contained in the inorganic particle layer 13 include, but are not limited to, metal oxides, metal nitrides, and other fine metal particles. Preferred examples of the metal oxides include, but are not limited to, $Al_2O_3$ (alumina), $TiO_2$, $BaTiO_3$, and $ZrO_2$.

Preferred examples of the metal nitrides include, but are not limited to, aluminum nitride and silicon nitride. Preferred examples of the other fine metal particles include, but are not limited to, fine particles of poorly-soluble ionic crystals such as aluminum fluoride, calcium fluoride, barium fluoride, and barium sulfate; and substances derived from mineral resources such as boehmite, zeolite, apatite, kaolin, mullite, spinel, olivine, sericite, and bentonite, and artifacts thereof.

Examples of the inorganic particle 61 further include glass ceramics powder. Preferred examples of the glass ceramics powder include, but are not limited to, crystallized glass ceramics using $ZnO$—$MgO$—$Al_2O_3$—$SiO_2$-based crystallized glass, and nonglass ceramics using $BaO$—$Al_2O_3$—$SiO_2$-based ceramic powder or $Al_2O_3$—$CaO$—$SiO_2$—$MgO$—$B_2O_3$-based ceramic powder.

More preferably, the inorganic particle 61 comprises an element having ionic conductivity. Specifically, the inorganic particle 61 may comprise a material containing at least one element selected from silicon element, aluminum element, and zirconium element, each of which having ionic conductivity.

Much more preferably, the inorganic particle 61 comprises $Al_2O_3$ (alumina). The inorganic particle layer 13 containing alumina particles as the inorganic particles 61 is highly insulating and highly heat-resistant and can be formed at low cost.

The use of the inorganic particle 61 prevents an internal short circuit of the nonaqueous electrolyte power storage element 1 and enhances the safety of the nonaqueous electrolyte power storage element 1. In addition, ionic conductivity in the inorganic particle layer 13 is improved due to ionic conduction occurring at the surface of the inorganic particle 61. Thus, input/output characteristics of the non-aqueous electrolyte power storage element 1 is improved.

The average particle diameter of the inorganic particle 61 contained in the inorganic particle layer 13 is preferably from 0.1 to 5 μm, and more preferably from 0.1 to 3 μm. When the average particle diameter is from 0.1 to 5 μm, the inorganic particle 61 is small enough to provide a large surface area, so that the lithium ion conducting effect is exerted even when the amount of the inorganic particle 61 is small. The average particle diameter of the inorganic particle 61 can be measured by a laser diffraction method.

The ionic functional group and ion-conducting functional group of the polymer 62 contained in the inorganic particle layer 13 are described in detail below. Ionic Functional Group In the present disclosure, the ionic functional group refers to sulfonic acid, sodium sulfonate, potassium sulfonate, lithium sulfonate, ammonium sulfonate, ammonium carboxylate, carboxylic acid, potassium carboxylate, sodium carboxylate, lithium carboxylate, ammonium carboxylate, boronic acid, sodium boronate, potassium boronate, lithium boronate, ammonium boronate, and primary, secondary, and tertiary amines and salts thereof.

Specific examples of repeating units in the ionic functional group include, but are not limited to, acrylic acid and salts thereof, methacrylic acid and salts thereof, maleic acid and salts thereof, vinyl sulfonic acid and salts thereof, vinyl phosphonic acid and salts thereof, methyl acrylate having sulfonic acid or a salt thereof on the alkyl terminal, methyl acrylate having a primary, secondary, or tertiary amine or a salt thereof (halogen ion) on the alkyl terminal, aspartic acid, ammonium aspartate, sodium aspartate, lithium aspartate, and potassium aspartate.

The ionic functional group may be either an anionic functional group or a cationic functional group. In a preferred embodiment in which the inorganic particle 61 in the inorganic particle layer 13 is alumina, it is preferable that the ionic functional group of the polymer 62 be an anionic functional group because alumina is cationic in a wide pH range.

In the present disclosure, the anionic functional group refers to a sulfonic acid group, a carboxylic acid group, a phosphoric acid group, and salts thereof having a counter ion. Preferably, the counter ion is a lithium cation or an ammonium cation in consideration of safety when used for a power storage element. The anionic functional group may contain any one or more of a sulfonic acid group, a carboxylic acid group, and a phosphoric acid group.

In the present disclosure, the ionic functional group can be located in either side chains or terminals of the polymer. In a case in which the inorganic particle layer 13 is formed by coating, it is preferable that a plurality of ionic functional groups be present in side chains for dispersibility of the core-shell particles. Ion-conducting Functional Group In the present disclosure, the ion-conducting functional group refers to a nonionic functional group containing a structure having an inorganic value of 20 or more on an organic-inorganic conceptual diagram. Specific examples thereof include ether group, oxyalkylene group, azo group, nitro group, imino group, primary, secondary, and tertiary amino groups, hydroxyl group, carboxylic anhydride group, and amide group.

Preferably, the inorganic particle layer 13 has good lithium ion conductivity. From this viewpoint, preferably, the ion-conducting functional group is an oxyalkylene group in which the number of carbon atoms in the alkylene portion is 4 or less. More preferably, the ion-conducting functional group is a polyoxyalkylene chain in which the number of repeating units is 3 or more. Specific examples of the polyoxyalkylene chain are represented by the following formulae (1) to (5). However, the polyoxyalkylene chain in the inorganic particle layer 13 is not limited to these structures.

[Chem. 1]

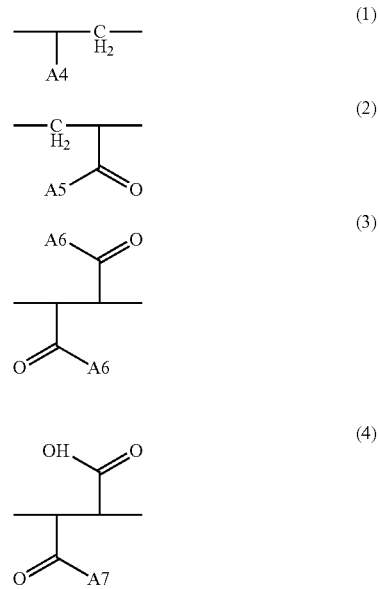

(5)

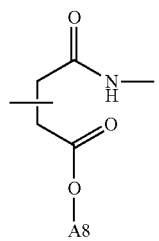

In the formulae (1) to (5), A4 represents —O—R or —CH$_2$—O—R; each of A5, A6, and A7 independently represents —OR or —NH—R; R represents a straight-chain or branched hydrocarbon chain having 1 to 24 carbon atoms or an oligoether chain; and A8 represents a straight-chain or branched hydrocarbon chain having 1 to 24 carbon atoms or an oligoether chain.

In the present disclosure, the oligoether chain refers to a molecule produced by polymerization of ethylene glycol or propylene glycol. When the molecular weight thereof is too small, the dispersibility is likely to deteriorate. When the molecular weight thereof is too large, the viscosity is likely to increase. Therefore, the preferred molecular weight is in the range of from 100 to 10,000, and the more preferred molecular weight is in the range of from 100 to 5,000.

The terminal of the oligoether chain may be hydroxyl group, methyl group, ethyl group, or propyl group, as necessary. Specific examples of repeating structural units having the oligoether chain are described below, however, the oligoether chain in the present disclosure is not limited thereto. In the following formulae, the symbol n indicating the degree of polymerization of the oligoether chain is variable depending on the purpose. By employing the oligoether chain, high dispersibility can be maintained even in a high-polarity solvent. Specific examples of the high-polarity solvent include, but are not limited to, methanol, ethanol, propanol, butanol, pentanol, NMP (N-methylpyrrolidone), DMSO (dimethyl sulfoxide), DMF (N,N-dimethylformamide), acetone, and THF (tetrahydrofuran).

Specific examples of repeating structural units having the oligoether chain are represented by the following formulae (6) to (45), but are not limited thereto. In the formulae (6) to (45), n represents an integer of 2 or more.

[Chem.2]

(6)

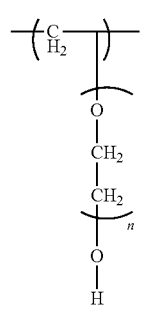

(7)

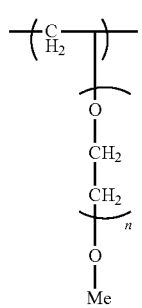

(8)

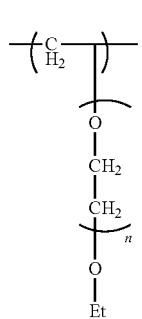

(9)

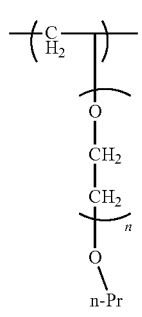

(10)

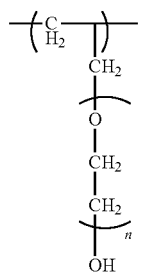

(11)

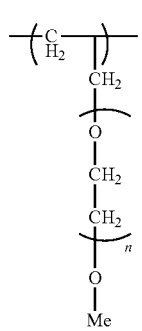

[Chem.3]
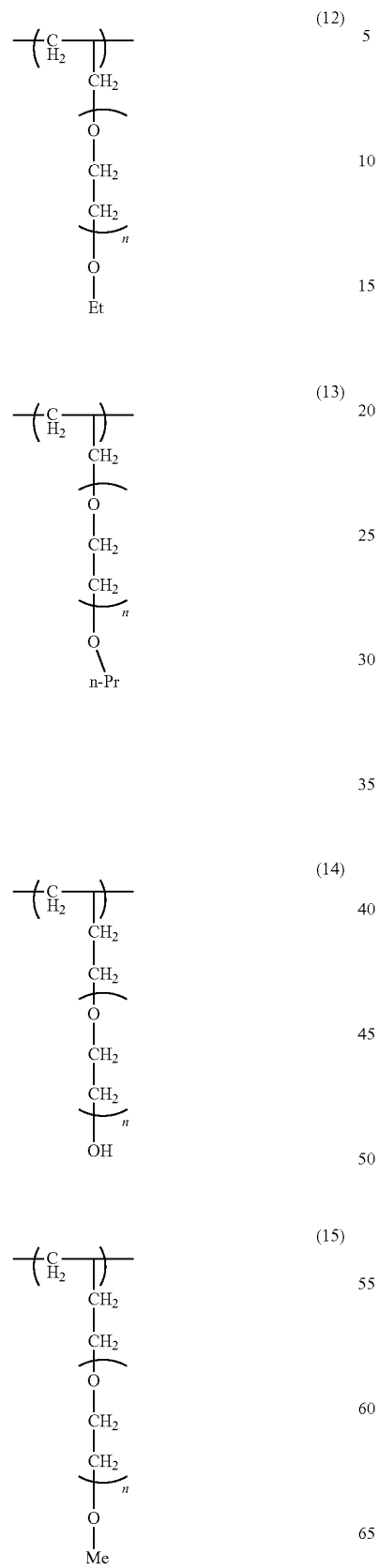
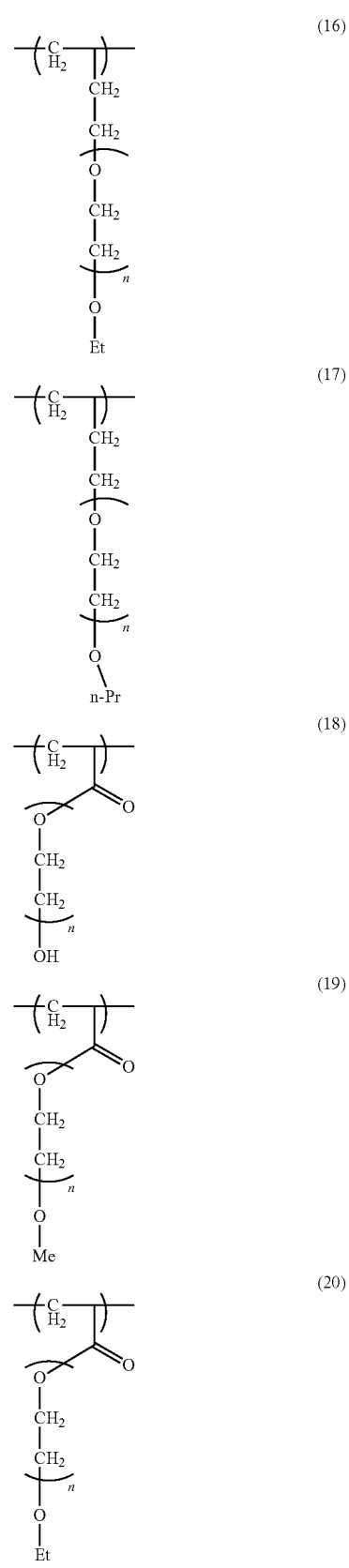

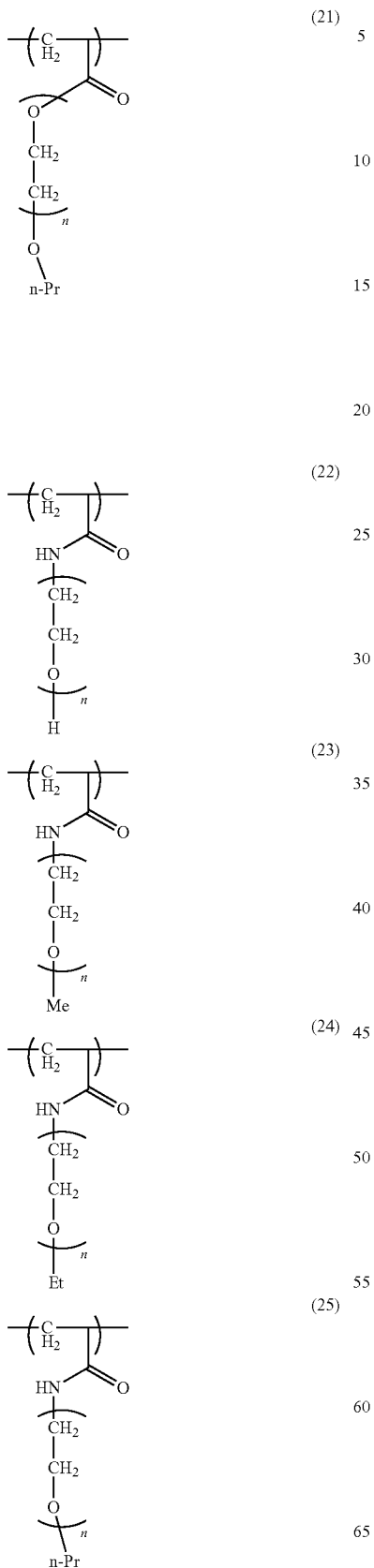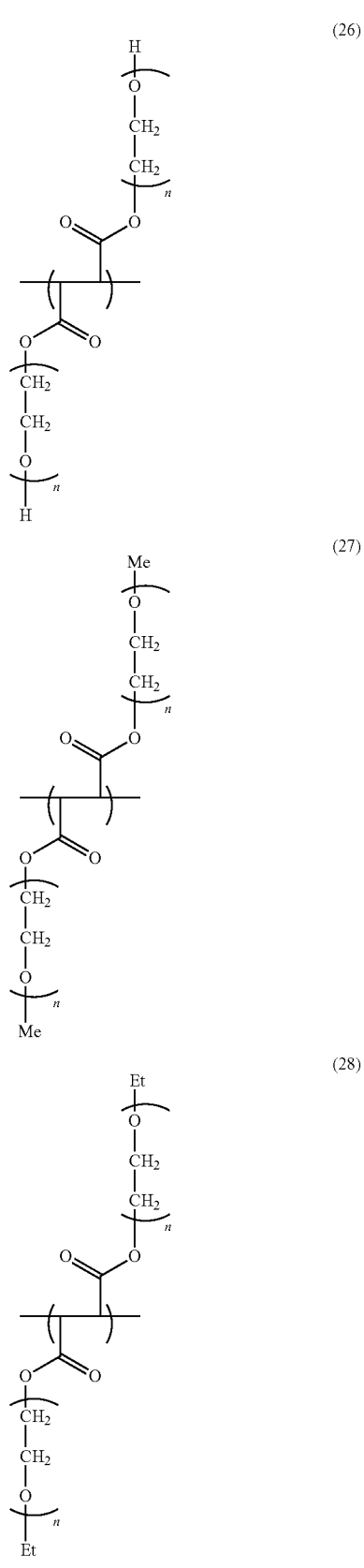

[Chem.5]
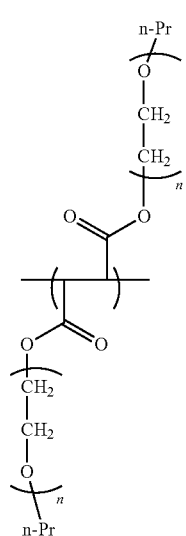
(29)
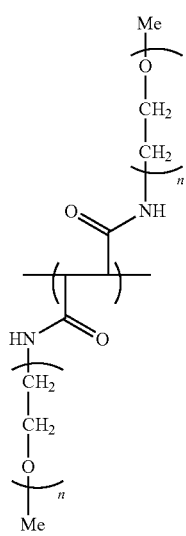
(30)
(31)
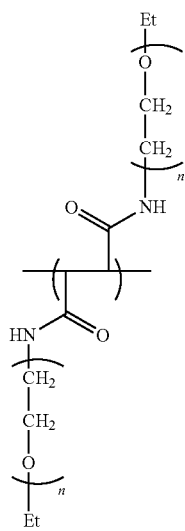
(32)
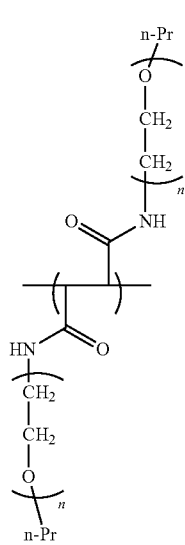
(33)
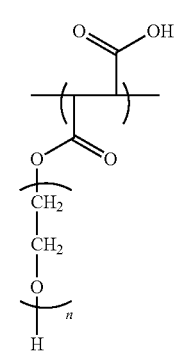
(34)

-continued
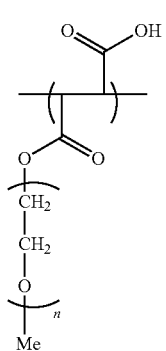
(35)
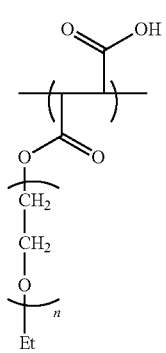
(36)
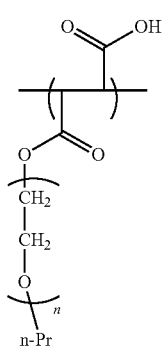
(37)
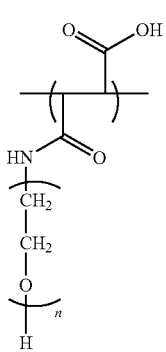
(38)
-continued
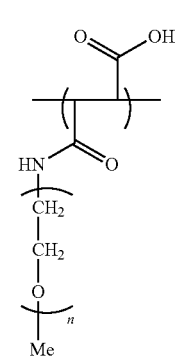
(39)
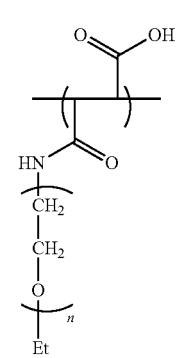
(40)
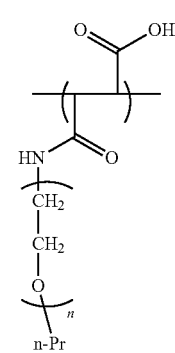
(41)
[Chem.6]
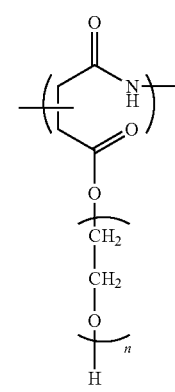
(42)

-continued

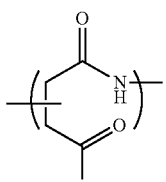
(43)

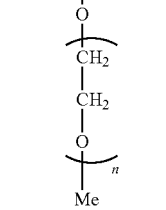
(44)

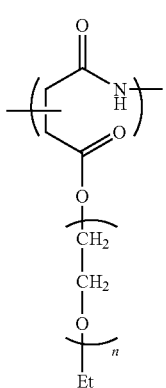
(45)

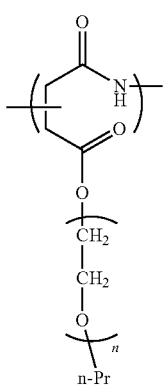

In the present disclosure, the polymer refers to a molecule having not only the above-described functional groups but also a number average molecular weight of from 500 to 100,000. For preventing an increase in viscosity of the dispersion liquid, the number average molecular weight is preferably from 1000 to 10,000, and more preferably from 1,000 to 5,000. The polymer contained in the inorganic particle layer 13 may be in any form of random copolymer, block copolymer, graft polymer, or dendrimer. For film formability, the polymer is preferably in the form of graft polymer.

The inorganic particle layer 13 may be formed by applying an ink containing the inorganic particle 61 and the polymer 62 onto the anode composite layer 12 by an inkjet method or the like and drying the applied ink. The ink may be prepared by dispersing the inorganic particle and the polymer in a solvent. As the solvent, a solvent suitable for dispersing the inorganic particle is selected. Specific examples thereof include water, hydrocarbon solvents, alcohol solvents, ketone solvents, ester solvents, and ether solvents. In preparing the ink, the dispersion process may be performed by a homogenizer. The homogenizer may be of a high-speed rotary shear stirring system, a high-pressure jet dispersion system, an ultrasonic dispersion system, or a medium stirring mill system.

In preparing the ink, additives such as a dispersant and a surfactant may be added, as necessary. Specific examples of the dispersant and surfactant include, but are not limited to, MEGAFACE (available from DIC Corporation), MALIALIM (available from NOF CORPORATION), ESLEAM (available from NOF CORPORATION), SOLSPERSE (available from The Lubrizol Corporation), and POLYFLOW (available from Kyoeisha Chemical Co., Ltd.). Examples of the additives further include a thickener for adjusting viscosity, such as propylene glycol and carboxymethyl cellulose.

In dispersing the inorganic particle in the solvent, a resin may be added. Examples of the resin include, but are not limited to, acrylic resin, SBR (styrene butadiene rubber) resin, PVdF (polyvinylidene fluoride), and PVP (polyvinylpyrrolidone). These resins exhibit the effect of firmly binding the inorganic particles with a small addition amount. Preferably, the proportion of the resin to the inorganic particle is from 0.5% to 5% by mass. In addition, preferably, the proportion of the polymer to the resin is from 40% to 100% by mass. In this case, binding of the inorganic particles 61 is ensured and input/output characteristics of the non-aqueous electrolyte power storage element 1 is improved when the inorganic particle layer 13 is used for the electrode of the nonaqueous electrolyte power storage element 1.

In preparing the ink, the polymer 62 binds to the inorganic particle 61 without being dispersed alone in the solution because the inorganic particle 61 having a surface potential and the polymer 62 form the core-shell structure 60. Therefore, when the inorganic particle layer 13 is formed on the anode composite layer 12, the polymer 62 is prevented from soaking into the anode composite layer 12 and ionic conduction in the anode composite layer 12 is not inhibited. Thus, degradation of input/output characteristics of the non-aqueous electrolyte power storage element 1 can be prevented.

In addition, the sheet resistance of the inorganic particle layer 13 can be kept low because the polymer 62 form the core-shell structure 60 with the inorganic particle 61 without completely cover the surface of the inorganic particle 61. Thus, ionic conduction is not inhibited at the surface of the inorganic particle 61, and degradation of input/output characteristics of the non-aqueous electrolyte power storage element 1 can be prevented. For preventing inhibition of ionic conduction and degradation of input/output characteristics of the non-aqueous electrolyte power storage element 1, it is preferable that the sheet resistance of the inorganic particle layer 13 be within the range of from 0.01 to 1.0 $\Omega \cdot cm^2$.

Since the polymer 62 has the ion-conducting functional group, ionic conductivity of the surface of the inorganic particle 61 in the inorganic particle layer 13 is improved, so that ionic conductivity in the inorganic particle layer 13 is improved. Thus, input/output characteristics of the non-aqueous electrolyte power storage element 1 is improved.

Further, in forming the inorganic particle layer 13, the main chain and the side chain of the polymer 62 get entangled, and the effect of binding the inorganic particles 61 in the core-shell structure 60 to each other is exerted. Thus, binding of the inorganic particles 61 is ensured, and physical strength of the inorganic particle layer 13 is improved. Moreover, the inorganic particle layer 13 is prevented from shrinking and breaking, thereby enhancing the safety of the non-aqueous electrolyte power storage element 1.

The film thickness of the inorganic particle layer 13 is preferably from 1 to 30 µm, and more preferably from 2 to 20 µm. When the film thickness of the inorganic particle layer 13 is large, insulating property of the surface of the electrode is high, and an internal short circuit is effectively prevented even in a cell having a large capacity. Thus, the safety of the non-aqueous electrolyte power storage element 1 is improved. When the film thickness of the inorganic particle layer 13 is too large, the distance between the electrodes so large that the input/output characteristics of the non-aqueous electrolyte power storage element 1 are degraded. When the film thickness of the inorganic particle layer 13 is 20 µm or less, an internal short circuit is effectively prevented, and input/output characteristics are maintained at the same time. When the film thickness of the inorganic particle layer 13 is smaller than 1 µm, the insulating effect is too small to prevent a short circuit and to improve the safety of the nonaqueous electrolyte power storage element 1. When the film thickness of the inorganic particle layer 13 is 1 µm or more, the insulating effect is exhibited.

The resistance value per unit area, that is, the sheet resistance ($\Omega \cdot cm^2$), of the inorganic particle layer 13, can be calculated as follows. First, a first non-aqueous electrolyte power storage element is prepared that contains an electrode having an electrode composite layer and an inorganic particle layer formed thereon. After charging and discharging the first non-aqueous electrolyte power storage element, the impedance within a range of from 100 to 0.01 k$\Omega$ is measured to obtain the Cole-Cole Plot. The sheet resistance AI is calculated by the formula AI=A($\Omega$)×S (cm$^2$), where A($\Omega$) represents the intersection of the Cole-Cole Plot and the real axis and S (cm$^2$) represents the total area in which the cathode and the anode are facing each other.

Next, a second non-aqueous electrolyte power storage element is prepared in the same manner as described above except that the inorganic particle layer 13 is not formed. After charging and discharging the second non-aqueous electrolyte power storage element, the impedance within a range of from 100 to 0.01 k$\Omega$ is measured to obtain the Cole-Cole Plot. The sheet resistance REF is calculated by the formula REF=B($\Omega$)×S (cm$^2$), where B($\Omega$) represents the intersection of the Cole-Cole Plot and the real axis and S (cm$^2$) represents the total area in which the cathode and the anode are facing each other.

The sheet resistance ($\Omega \cdot cm^2$) of the inorganic particle layer 13 is then obtained by the formula AI−REF, i.e., subtracting the sheet resistance REF from the sheet resistance AI.

Separator

The separator 30 is provided between the anode and the cathode in order to prevent a short circuit between the anode and the cathode. The separator 30 is an insulating layer having ion permeability and no electron conductivity. The material, shape, size, and structure of the separator 30 is not particularly limited and can be suitably selected to suit to a particular application.

Examples of the material of the separator 30 include, but are not limited to, papers such as Kraft paper, vinylon mixed paper, and synthetic pulp mixed paper, cellophane, polyethylene grafted films, polyolefin unwoven fabrics such as polypropylene meltflow unwoven fabric, polyamide unwoven fabrics, glass fiber unwoven fabrics, polyethylene microporous membranes, and polypropylene microporous membranes. Among these, those having a porosity of 50% or more are preferable for retaining the non-aqueous electrolyte.

The average thickness of the separator 30 is not particularly limited and can be suitably selected to suit to a particular application, but is preferably from 3 to 50 µm, more preferably from 5 to 30 µm. When the average thickness of the separator 30 is 3 m or more, a short circuit between the anode and the cathode can be reliably prevented. When the average thickness of the separator 30 is 50 µm or less, the anode and the cathode are not too far apart, so that an increase in electrical resistance between the anode and the cathode can be prevented.

When the average thickness of the separator 30 is 5 µm or more, a short circuit between the anode and the cathode can be more reliably prevented. When the average thickness of the separator 30 is 30 µm or less, the anode and the cathode are not too far apart, so that an increase in electrical resistance between the anode and the cathode can be more prevented.

The shape of the separator 30 may be a sheet-like shape. The size of the separator 30 is not particularly limited and can be suitably selected to suit to a particular application as long as the separator 30 can be used for the power storage element. The structure of the separator 30 may be either a single layer structure or a laminated structure.

Electrolyte Layer

The non-aqueous electrolyte that constitutes the electrolyte layer 51 is an electrolytic solution containing a non-aqueous solvent and an electrolyte salt. The non-aqueous solvent is not particularly limited and can be suitably selected to suit to a particular application, but an aprotic organic solvent is preferable. Examples of the aprotic organic solvent include, but are not limited to, carbonate-based organic solvents such as chain carbonates and cyclic carbonates. Examples of the chain carbonates include, but are not limited to, dimethyl carbonate (DMC), diethyl carbonate (DEC), methyl ethyl carbonate (EMC), and methyl propionate (MP).

Examples of the cyclic carbonates include, but are not limited to, propylene carbonate (PC), ethylene carbonate (EC), butylene carbonate (BC), and vinylene carbonate (VC). In the case of using a mixed solvent which combines ethylene carbonate (EC) as the cyclic carbonate and dimethyl carbonate (DMC) as the chain carbonate, the mixing ratio between ethylene carbonate (EC) and dimethyl carbonate (DMC) is not particularly limited and can be suitably selected to suit to a particular application.

Examples of the non-aqueous solvent further include, but are not limited to, esterbased organic solvents such as cyclic esters and chain esters, and ether-based organic solvents such as cyclic ethers and chain ethers.

Specific examples of the cyclic esters include, but are not limited to, γ-butyrolactone (γBL), 2-methyl-γ-butyrolactone, acetyl-γ-butyrolactone, and γ-valerolactone.

Specific examples of the chain esters include, but are not limited to, propionic acid alkyl esters, malonic acid dialkyl esters, acetic acid alkyl esters (e.g., methyl acetate (MA), ethyl acetate), and formic acid alkyl esters (e.g., methyl formate (MF), ethyl formate).

Specific examples of the cyclic ethers include, but are not limited to, tetrahydrofuran, alkyltetrahydrofuran, alkoxytetrahydrofuran, dialkoxytetrahydrofuran, 1,3-dioxolan, alkyl-1,3-dioxolan, and 1,4-dioxolan.

Specific examples of the chain ethers include, but are not limited to, 1,2-dimethoxyethane (DME), diethyl ether, ethylene glycol dialkyl ethers, diethylene glycol dialkyl ethers, triethylene glycol dialkyl ethers, and tetraethylene glycol dialkyl ethers.

Examples of the electrolyte salt include a lithium salt. The lithium salt is not particularly limited and can be suitably selected to suit to a particular application. Examples thereof include, but are not limited to, lithium hexafluorophosphate (LiPF), lithium perchlorate ($LiClO_4$), lithium chloride (LiCl), lithium tetrafluoroborate ($LiBF_4$), lithium hexafluoroarsenate ($LiAsF_6$), lithium trifluoromethanesulfonate ($LiCF_3SO_3$), lithium bis(trifluoromethylsulfonyl)imide ($LiN(CF_3SO_2)_2$), and lithium bis(perfluoroethylsulfonyl)imide ($LiN(C_2F_5SO_2)_2$). Each of these materials may be used alone or in combination with others. Among these, $LiPF_6$ is particularly preferable for a large occlusion amount of anions in the carbon electrode.

The amount of the electrolyte salt in the non-aqueous solvent is not particularly limited and can be suitably selected to suit to a particular application, but is preferably from 0.7 to 4 mol/L, more preferably from 1.0 to 3 mol/L, and particularly preferably from 1.0 to 2.5 mol/L for achieving a good balance between the capacity and the output of the power storage element.

Method for Manufacturing Non-Aqueous Electrolyte Power Storage Element

Preparation of Anode

To prepare the anode 17 illustrated in FIG. 3, first, the anode substrate 11 made of stainless steel, copper, or the like is prepared. Next, an anode material composition in a slurry state is prepared by adding a binder, a conducting agent, a solvent, and the like, to the anode active material. The anode material composition is then applied onto one surface of the anode substrate 11 and dried to form the anode composite layer 12. Similarly, the anode composite layer 12 is also formed on the other surface of the anode substrate 11. The anode substrate 11 and each anode composite layer 12 are bonded to each other.

Next, a composition for the inorganic particle layer 13 is prepared by mixing particles of ceramics, such as alumina, with a polymer and a solvent. The composition is applied onto one of the anode composite layers 12 and dried to form an inorganic particle layer 13. Similarly, the inorganic particle layer 13 is also formed on the other one of the anode composite layers 12. Thus, formation of the anode 17 is completed.

The application of the anode material composition and the composition for the inorganic particle layer 13 may be performed by an inkjet method. However, the application method is not particularly limited and can be suitably selected to suit to a particular application. For example, a die coater, a COMMA COATER, a gravure coater, screen printing, dry press coating, or a dispenser system may be employed.

The inkjet method is able to apply an object to the targeted position of the lower layer, which is preferable. Moreover, the inkjet method is able to bond the top and bottom surfaces of the anode substrate 11, the anode composite layer 12, and the inorganic particle layer 13 that are in contact with each other, which is preferable. In addition, the ink jet method is able to make the film thickness of each layer uniform, which is preferable.

The solvent is not particularly limited and can be suitably selected to suit to a particular application. Examples thereof include, but are not limited to, water-based solvents and organic solvents. Examples of the water-based solvents include, but are not limited to, water and alcohols. Examples of the organic solvents include, but are not limited to, N-methyl-2-pyrrolidone (NMP) and toluene.

In addition, a mixture of the anode active material, a binder, a conducting agent, etc., may be roll-formed into a sheet electrode or compression-molded into a pellet electrode. Alternatively, a thin film of the anode active material may be formed on the anode substrate 11 by means of vapor deposition, sputtering, or plating. Preparation of Cathode To prepare the cathode 27 illustrated in FIG. 3, first, the cathode substrate 21 made of stainless steel, aluminum, or the like is prepared. Next, a cathode material composition in a slurry state is prepared by adding a binder, a thickener, a conducting agent, a solvent, and the like, to the cathode active material. The cathode material composition is then applied onto one surface of the cathode substrate 21 and dried to form the cathode composite layer 22. Similarly, the cathode composite layer 22 is also formed on the other surface of the cathode substrate 21. The cathode substrate 21 and each cathode composite layer 22 are bonded to each other.

The application of the cathode material composition may be performed by an inkjet method. However, the application method is not particularly limited and can be suitably selected to suit to a particular application. For example, a die coater, a COMMA COATER, a gravure coater, screen printing, dry press coating, or a dispenser system may be employed.

Examples of the solvent include those used in preparing the anode 17. The cathode active material may be directly roll-formed into a sheet electrode or compression-molded into a pellet electrode.

Preparation of Electrode Element and Non-Aqueous Electrolyte Power Storage Element To prepare the electrode element 40 and the non-aqueous electrolyte power storage element 1, first, the cathode 27 is disposed on one side of the anode 17 such that one of the inorganic particle layers 13 of the anode 17 and the cathode composite layer 22 of the cathode 27 face each other with the separator 30 interposed therebetween. Similarly, the cathode 27 is disposed on the other side of the anode 17 such that the other one of the inorganic particle layers 13 of the anode 17 and the cathode composite layer 22 of the cathode 27 face each other with the separator 30 interposed therebetween.

Next, the anode lead wire 41 is joined to the anode substrate 11 by welding or the like, and the cathode lead wire 42 is joined to the cathode substrate 21 by welding or the like, thereby producing the electrode element 40 illustrated in FIG. 3. Next, the electrolyte layer 51 is formed by injecting a non-aqueous electrolyte into the electrode element 40 and sealed with the exterior 52, thus preparing the non-aqueous electrolyte power storage element 1 illustrated in FIG. 4.

As described above, the number of the anodes 17 and the cathodes 27 stacked in the electrode element 40 can be arbitrarily determined. As an example, each of the embodiments illustrated in FIGS. 3 and 4 includes one anode 17 and two cathodes 27, i.e., three layers in total. The number of the stacked layers is not limited to this, and more anodes 17 and cathodes 27 can be stacked.

Thus, the anode 17 used for the non-aqueous electrolyte power storage element 1 according to the present embodiment includes the anode composite layer 12 and the inorganic particle layer 13. The inorganic particle layer 13 contains: the inorganic particle 61 being insulating and having a surface potential; and the polymer 62 having an ionic functional group (A) and an ion-conducting functional group (B) each charged opposite to the surface potential of the inorganic particle 61. The inorganic particle 61 and the polymer 62 are bonded to each other by ionic interaction.

Thus, the polymer is prevented from soaking into the anode composite layer 12 and a decrease of lithium ion conduction in the anode composite layer 12 is effectively prevented.

In addition, the polymer 62 does not cover the surface of the inorganic particle 61 because the inorganic particle 61 and the polymer 62 bond to each other by ionic interaction. Therefore, lithium ion diffusion is exhibited on the surface of the inorganic particle 61, and as a result, input/output characteristics of the non-aqueous electrolyte power storage element 1 is improved.

In addition, since the polymer 62 has an ionic functional group, the main chain and the side chain of the polymer 62 get entangled, and the effect of binding the inorganic particles 61 in the core-shell structure 60 to each other is exerted. Thus, the physical strength of the inorganic particle layer 13 is improved, and the safety of the nonaqueous electrolyte power storage element 1 is improved.

In the non-aqueous electrolyte power storage element 1 according to the first embodiment, the inorganic particle layer is provided on the anode. However, the present embodiment is not limited thereto, and the inorganic particle layer may be provided on the cathode composite layer of the cathode. In this case, it is not necessary to provide the inorganic particle layer on the anode. Alternatively, the inorganic particle layer may be provided on the cathode, and the inorganic particle layer may be further provided on the anode. In either of these cases, the same effects as in the first embodiment is exhibited.

In the case of forming an inorganic particle layer on the cathode, the same effect as in the case of forming it on the anode is exhibited when the film thickness thereof is the same.

The above-described embodiment is an example. It is possible to appropriately design the non-aqueous electrolyte power storage element depending on the required battery characteristics.

Second Embodiment

In the second embodiment, a mixture layer is provided between the electrode composite layer and the inorganic particle layer. Note that in the second embodiment, descriptions of the same components as those of the above-described embodiments may be omitted.

Figure 8A:
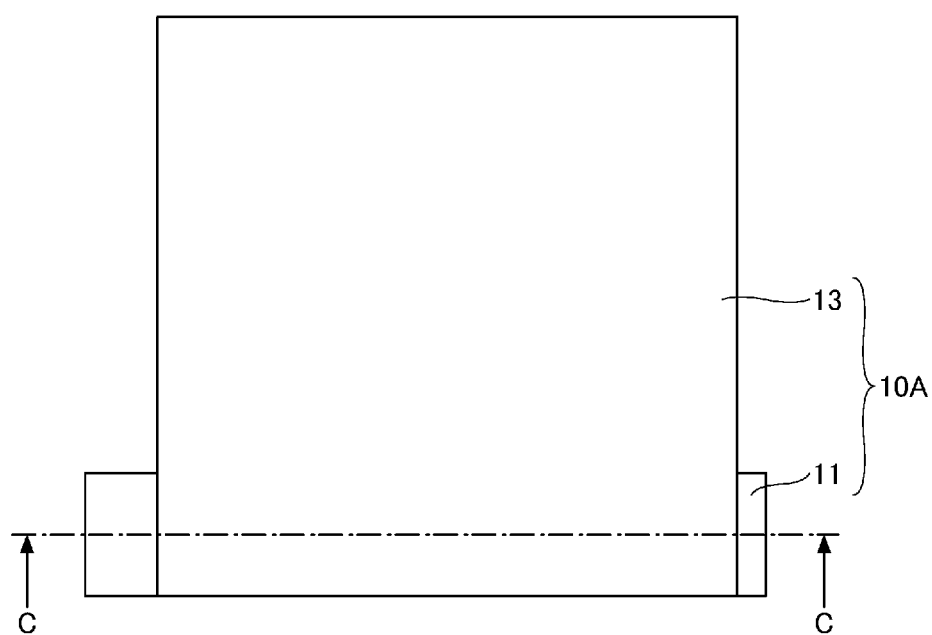
FIGS. 8A and 8B are diagrams illustrating an anode for use in a non-aqueous electrolyte power storage element according to the second embodiment.
Figure 8B:
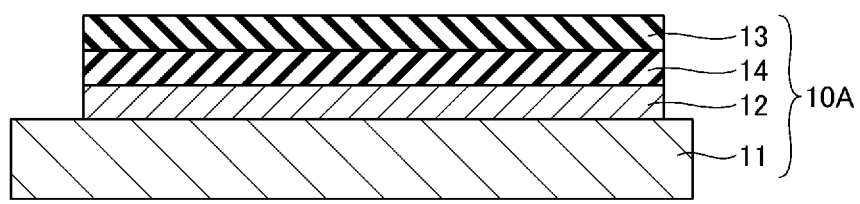

FIG. 8A is a plan view of an anode for use in a non-aqueous electrolyte power storage element according to the second embodiment. FIG. 8B is a cross-sectional view of the anode illustrated in FIG. 8A taken along a dotted line C-C.

Referring to FIGS. 8A and 8B, an anode 10A is different from the anode 10 (illustrated in FIGS. 1A and 1B) in that a mixture layer 14 is formed on the anode composite layer 12.

The mixture layer 14 contains an anode composite material, an inorganic particle, and a polymer. The anode composite material contained in the mixture layer 14 is as described above. That is, the mixture layer 14 contains at least an anode active material, and may contain a binder, a thickener, a conducting agent, or the like, as necessary.

The inorganic particle contained in the mixture layer 14 may be the same as the insulating inorganic particle in the inorganic particle layer 13. Examples thereof include, but are not limited to, metal oxides, metal nitrides, and other fine metal particles. Preferred examples of the metal oxides include, but are not limited to, $Al_2O_3$ (alumina), $TiO_2$, $BaTiO_3$, and $ZrO_2$.

Preferred examples of the metal nitrides include, but are not limited to, aluminum nitride and silicon nitride. Preferred examples of the other fine metal particles include, but are not limited to, fine particles of poorly-soluble ionic crystals such as aluminum fluoride, calcium fluoride, barium fluoride, and barium sulfate; and substances derived from mineral resources such as boehmite, zeolite, apatite, kaolin, mullite, spinel, olivine, sericite, and bentonite, and artifacts thereof.

Examples of the inorganic particle further include glass ceramics powder. Preferred examples of the glass ceramics powder include, but are not limited to, crystallized glass ceramics using $ZnO$—$MgO$—$Al_2O_3$—$SiO_2$-based crystallized glass, and non-glass ceramics using $BaO$—$Al_2O_3$—$SiO_2$-based ceramic powder or $Al_2O_3$—$CaO$—$SiO_2$—$MgO$—$B_2O_3$-based ceramic powder.

More preferably, the inorganic particle comprises an element having ionic conductivity. Specifically, the inorganic particle may comprise a material containing at least one element selected from silicon element, aluminum element, and zirconium element, each of which having ionic conductivity. Much more preferably, the inorganic particle comprises $Al_2O_3$ (alumina).

As the mixture layer 14 is provided on the anode composite layer 12, diffusion of lithium is accelerated in the vicinity of the surface of the anode composite layer 12 and deposition of lithium is prevented in the vicinity of the surface of the anode composite layer 12. As a result, it is possible to prevent deterioration of the non-aqueous electrolyte power storage element 1 due to lithium deposition in the vicinity of the surface of the anode, thereby improving the life characteristics of the non-aqueous electrolyte power storage element 1.

The average particle diameter of the inorganic particle contained in the mixture layer 14 is preferably from 0.1 to 5 μm, and more preferably from 0.1 to 3 μm. When the average particle diameter is from 0.1 to 5 μm, the inorganic particle is small enough to provide a large surface area, so that the lithium diffusing effect is exerted even when the amount of the inorganic particle is small. The average particle diameter of the inorganic particle can be measured by a laser diffraction method.

The polymer contained in the mixture layer 14 may be the same as the polymer in the inorganic particle layer 13, which has an ionic functional group and an ion-conducting functional group each charged opposite to the surface potential of the inorganic particle. The ionic functional group and the ion-conducting functional group have been described in detail in the first embodiment. Similar to the first embodiment, the polymer charged opposite to the surface potential of the inorganic particle is bonded to the inorganic particle by ionic interaction to form the core-shell structure.

The film thickness of the mixture layer 14 is preferably in the range of from 1% to 20% of the film thickness of the anode composite layer 12. As the mixture layer 14 is provided on the anode composite layer 12, the lithium conducting function is exhibited at the surface of the inorganic particle, and lithium deposition that is likely to occur in the vicinity of the surface of the anode composite layer 12 is more effectively prevented. Thus, the life characteristics of the non-aqueous electrolyte power storage element 1 are improved. When the film thickness of the mixture layer 14 is too larger than that of the anode composite layer 12, the distance between the cathode and the anode is so large that the input/output characteristics of the non-aqueous electrolyte power storage element 1 are degraded. When the film thickness of the mixture layer 14 is smaller than that of the anode composite layer 12, a desired effect is not exerted. Moreover, as the anode composite material and the inorganic particle are mixed, lithium diffusibility is improved at the surface of the inorganic particle, and therefore lithium diffusibility in the mixture layer 14 is improved. Thus, the input/output characteristics of the non-aqueous electrolyte power storage element 1 are improved.

The film thicknesses of the anode composite layer 12 and the mixture layer 14 can be measured as follows. That is, a cross-section of each layer is cut out and observed with a scanning electron microscope to measure the film thickness.

The mixture layer 14 may be formed by applying an ink containing an anode active material, a conducting auxiliary agent, the inorganic particle 61, and the polymer 62 onto the anode composite layer 12 by an inkjet method or the like and drying the applied ink. The ink may be prepared by dispersing the anode active material, the conducting auxiliary agent, the dispersant, the surfactant, the inorganic particle, and the polymer in a solvent. As the solvent, a solvent suitable for dispersing the anode active material and the inorganic particle is selected. Specific examples thereof include water, hydrocarbon solvents, alcohol solvents, ketone solvents, ester solvents, and ether solvents. In preparing the ink, the dispersion process may be performed by a homogenizer. The homogenizer may be of a high-speed rotary shear stirring system, a high-pressure jet dispersion system, an ultrasonic dispersion system, or a medium stirring mill system.

In preparing the ink, additives such as a dispersant and a surfactant may be added, as necessary. Specific examples of the dispersant and surfactant include, but are not limited to, MEGAFACE (available from DIC Corporation), MALIALIM (available from NOF CORPORATION), ESLEAM (available from NOF CORPORATION), SOLSPERSE (available from The Lubrizol Corporation), and POLYFLOW (available from Kyoeisha Chemical Co., Ltd.). Examples of the additives further include a thickener for adjusting viscosity, such as propylene glycol and carboxymethyl cellulose. In dispersing the inorganic particle in the solvent, a resin may be added. Examples of the resin include, but are not limited to, acrylic resin, SBR (styrene butadiene rubber) resin, PVdF (polyvinylidene fluoride), and PVP (polyvinylpyrrolidone). These resins exhibit the effect of firmly binding the inorganic particles with a small addition amount. Preferably, the proportion of the polymer and the resin to the inorganic particle is from 0.5% to 5% by mass. The mixture layer 14 can have any film thickness depending on the amount of the ink applied.

Figure 9:
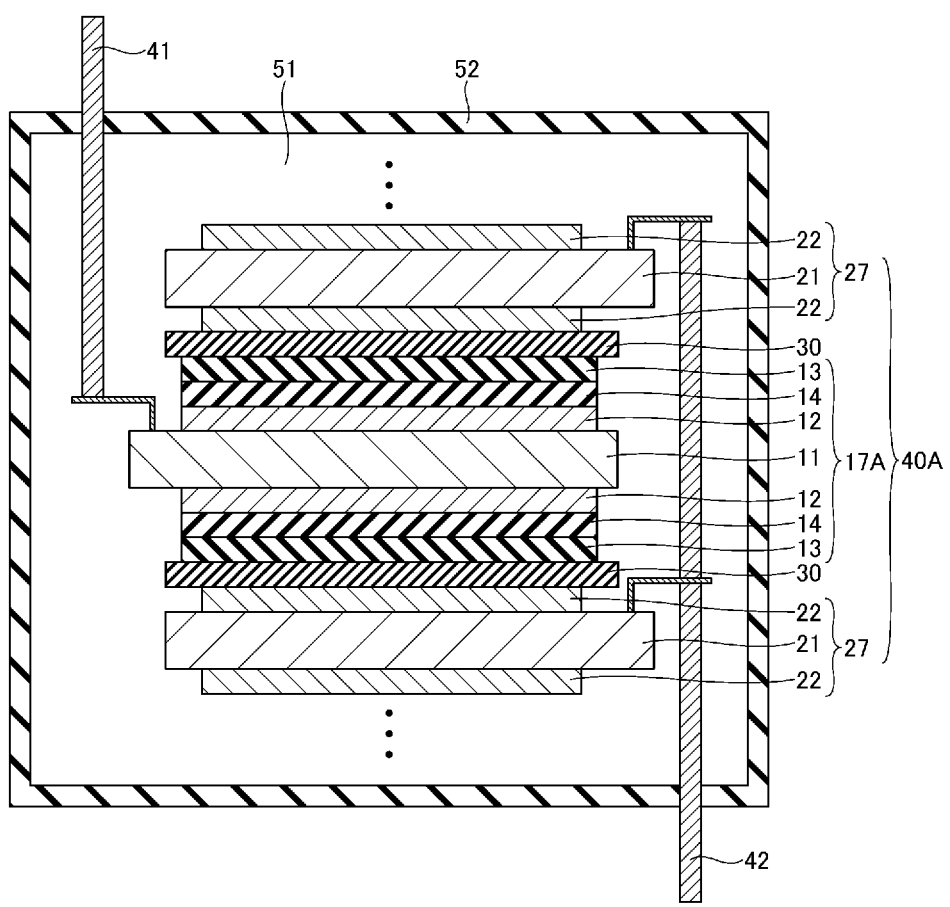
FIG. 9 is a cross-sectional view of the non-aqueous electrolyte power storage element according to the second embodiment.

FIG. 9 is a cross-sectional view of the non-aqueous electrolyte power storage element according to the second embodiment. Referring to FIG. 9, a non-aqueous electrolyte power storage element 1A is different from the non-aqueous electrolyte power storage element 1 (illustrated in FIG. 4) in that the electrode element 40 is replaced with an electrode element 40A.

The electrode element 40A has a structure in which the cathode 27 is stacked on both sides of an anode 17A with the separator 30 interposed therebetween. The anode 17A is the same as the anode 10A (illustrated in FIGS. 8A and 8B) except that the anode composite layer 12, the mixture layer 14, and the inorganic particle layer 13 are formed on both sides of the anode substrate 11.

The number of the anodes 17A and the cathodes 27 stacked in the electrode element 40A can be arbitrarily determined. As an example, the embodiment illustrated in FIG. 9 includes one anode 17A and two cathodes 27, i.e., three layers in total. The number of the stacked layers is not limited to this, and more anodes 17A and cathodes 27 can be stacked. In such cases, the number of the anodes 17A and the number of the cathodes 27 may be the same.

In the non-aqueous electrolyte power storage element 1A, as the mixture layer 14 is provided on the anode composite layer 12 of the anode 17A, the following effects are exhibited in addition to the effects exhibited by the non-aqueous electrolyte power storage element 1. That is, it is possible to prevent lithium deposition in the vicinity of the surface of the anode composite layer 12, thereby improving the life characteristics of the non-aqueous electrolyte power storage element 1A.

Moreover, as the mixture layer 14 is provided, lithium diffusibility is improved at the surface of the inorganic particle, and therefore lithium diffusibility in the mixture layer 14 is improved. Thus, the input/output characteristics of the non-aqueous electrolyte power storage element 1A are improved.

In addition, as the inorganic particle layer 13 is provided on the mixture layer 14, immixing of foreign matter into the anode 17 is prevented and a short circuit between the anode and the cathode is also prevented, thereby improving the safety of the nonaqueous electrolyte power storage element 1A. Although it is not necessary to provide the separator between the anode and the cathode, when the separator is provided between the anode and the cathode, a short circuit between the anode and the cathode is prevented during melting of the separator.

In the anode 17A, as the mixture layer 14 is provided on the anode composite layer 12 and the inorganic particle layer 13 is provided on the mixture layer 14, the life characteristics of the non-aqueous electrolyte power storage element 1A are improved and the input/output characteristics and the safety are satisfactory at the same time.

In the non-aqueous electrolyte power storage element 1A according to the second embodiment, the mixture layer 14 and the inorganic particle layer 13 are provided on the anode. However, the present embodiment is not limited thereto, and a mixture layer of cathode composite material and inorganic particle may be provided on the cathode composite layer of the cathode and an inorganic particle layer may be provided on the mixture layer. In this case, it is not necessary to provide the mixture layer 14 and the inorganic particle layer 13 on the anode. Alternatively, a mixture layer of cathode composite material and inorganic particle and an inorganic particle layer may be provided on the cathode, and the mixture layer 14 and the inorganic particle layer 13 may be further provided on the anode. In either of these cases, the same effects as in the second embodiment is exhibited.

In the case of providing a mixture layer of cathode composite material and inorganic particle on the cathode, the film thickness of the mixture layer of cathode composite material and inorganic particle is not particularly limited and can be suitably selected to suit to a particular application, but is preferably from 0.1 to 30 μm, more preferably from 0.1 to 10 μm, and much more preferably from 0.1 to 5 μm.

When the film thickness of the mixture layer of cathode composite material and inorganic particle is from 0.1 to 30 μm, the inorganic particle having ionic conductivity diffuses lithium in the vicinity of the surface of the cathode, thereby supplying lithium ion to the cathode material (metal oxide) having low electric conductivity. Thus, the performance (input/output characteristics) of the non-aqueous electrolyte power storage element 1A is improved.

When the film thickness of the mixture layer of cathode composite material and inorganic particle is from 0.1 to 10 µm, lithium ion is more supplied to the cathode material (metal oxide) having low electric conductivity, thereby more improving the performance (input/output characteristics) of the non-aqueous electrolyte power storage element 1A. When the film thickness of the mixture layer of cathode composite material and inorganic particle is from 0.1 to 5 µm, lithium ion is much more supplied to the cathode material (metal oxide) having low electric conductivity, thereby much more improving the performance (input/output characteristics) of the non-aqueous electrolyte power storage element 1A.

In the case of forming an inorganic particle layer on the cathode, the same effect as in the case of forming it on the anode is exhibited when the film thickness thereof is the same.

The above-described embodiment is an example. It is possible to appropriately design the non-aqueous electrolyte power storage element depending on the required battery characteristics.

Third Embodiment

In the third embodiment, a mixture layer of inorganic particle and porous resin is provided on the inorganic particle layer. Note that in the third embodiment, descriptions of the same components as those of the above-described embodiments may be omitted.

Figure 10A:
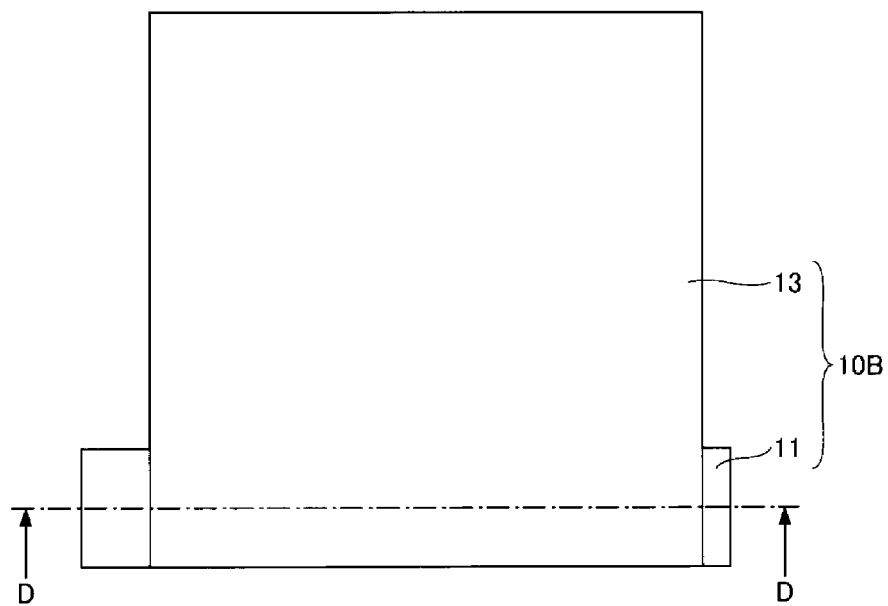
FIGS. 10A and 10B are diagrams illustrating an anode for use in a non-aqueous electrolyte power storage element according to the third embodiment.
Figure 10B:
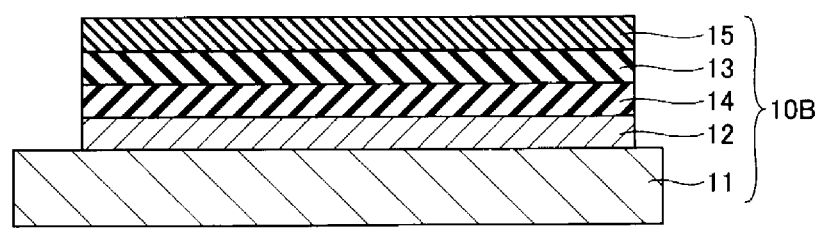

FIG. 10A is a plan view of an anode for use in a non-aqueous electrolyte power storage element according to the third embodiment. FIG. 10B is a cross-sectional view of the anode illustrated in FIG. 10A taken along a dotted line D-D.

Referring to FIGS. 10A and 10B, an anode 10B is different from the anode 10A (illustrated in FIGS. 8A and 8B) in that a mixture layer 15 is formed on the inorganic particle layer 13.

The mixture layer 15 contains an inorganic particle and a porous resin. The inorganic particle contained in the mixture layer 15 may be the same as the insulating inorganic particle in the mixture layer 14. Examples thereof include, but are not limited to, metal oxides, metal nitrides, and other fine metal particles. Preferred examples of the metal oxides include, but are not limited to, $Al_2O_3$ (alumina), $TiO_2$, $BaTiO_3$, and $ZrO_2$.

Preferred examples of the metal nitrides include, but are not limited to, aluminum nitride and silicon nitride. Preferred examples of the other fine metal particles include, but are not limited to, fine particles of poorly-soluble ionic crystals such as aluminum fluoride, calcium fluoride, barium fluoride, and barium sulfate; and substances derived from mineral resources such as boehmite, zeolite, apatite, kaolin, mullite, spinel, olivine, sericite, and bentonite, and artifacts thereof.

Examples of the inorganic particle further include glass ceramics powder. Preferred examples of the glass ceramics powder include, but are not limited to, crystallized glass ceramics using $ZnO$—$MgO$—$Al_2O_3$—$SiO_2$-based crystallized glass, and non-glass ceramics using $BaO$—$Al_2O_3$—$SiO_2$-based ceramic powder or $Al_2O_3$—$CaO$—$SiO_2$—$MgO$—$B_2O_3$-based ceramic powder. The average particle diameter of the inorganic particle contained in the mixture layer 15 is preferably from 0.1 to 5 µm, and more preferably from 0.1 to 3 µm.

Examples of resins for forming the porous resin contained in the mixture layer 15 include, but are not limited to, acrylate resins, methacrylate resins, urethane acrylate resins, vinyl ester resins, unsaturated polyesters, epoxy resins, oxetane resins, vinyl ethers, and resins utilizing an ene-thiol reaction. Among these, acrylate resins, methacrylate resins, urethane acrylate resins, and vinyl ester resins, which are able to easily form structures by radical polymerization due to their high reactivity, are preferred in terms of productivity.

Preferably, the film thickness of the mixture layer 15 is from 0.1 to 100 µm. When the film thickness of the mixture layer 15 is from 0.1 to 100 µm, lithium diffusibility is improved at the surface of the inorganic particle, and therefore lithium diffusibility in the mixture layer 15 is improved. Thus, the input/output characteristics of the nonaqueous electrolyte power storage element 1B is improved.

Preferably, the film thickness of the mixture layer 15 is from 3 to 50 µm, more preferably from 5 to 30 µm. The mixture layer 15 has a function of preventing a short circuit between the cathode and the anode. When the film thickness of the mixture layer 15 is 3 µm or more, a short circuit between the anode and the cathode can be reliably prevented. When the film thickness of the mixture layer 15 is 5 µm or more, a short circuit between the anode and the cathode can be more reliably prevented.

When the film thickness of the mixture layer 15 is 50 µm or less, the anode and the cathode are not too far apart, so that an increase in electrical resistance between the anode and the cathode can be prevented. When the film thickness of the mixture layer 15 is 30 µm or less, the anode and the cathode are not too far apart, so that an increase in electrical resistance between the anode and the cathode can be more prevented.

Preferably, the porosity of the mixture layer 15 is from 30% to 80%, more preferably from 40% to 75%. When the porosity is small, the amount of retention of electrolyte is small, so that the film thickness should be increased. When the film thickness is large, the distance between the electrodes is large, so that the input/output characteristics are degraded. When the porosity is large, the input/output characteristics are improved because the movement resistance of the electrolyte is reduced. However, when the porosity is too large, the structure becomes brittle and weak against vibration and impact. When the porosity of the mixture layer 15 is from 30% to 80%, the amount of retention of electrolyte is ensured without increasing the film thickness, and at the same time, the desired input/output characteristics can be achieved while preventing the structure from becoming brittle.

The porosity can be determined from the area ratio between the voids and the structure in an image of a cross-section of the mixture layer observed with SEM.

Preferably, the total film thickness of the inorganic particle layer 13 and the mixture layer 15 is from 1 to 100 µm, more preferably from 3 to 50 µm, and much more preferably from 5 to 30 µm.

When the total film thickness of the inorganic particle layer 13 and the mixture layer 15 is 1 µm or more, a short circuit between the anode and the cathode can be reliably prevented. When the total film thickness of the inorganic particle layer 13 and the mixture layer 15 is 100 µm or less, the anode and the cathode are not too far apart, so that an increase in electrical resistance between the anode and the cathode can be prevented.

When the total film thickness of the inorganic particle layer 13 and the mixture layer 15 is 3 µm or more, a short circuit between the anode and the cathode can be more reliably prevented. When the total film thickness of the inorganic particle layer 13 and the mixture layer 15 is 50 µm or less, the anode and the cathode are not too far apart, so that an increase in electrical resistance between the anode and the cathode can be more prevented.

When the total film thickness of the inorganic particle layer 13 and the mixture layer 15 is 5 µm or more, a short circuit between the anode and the cathode can be much more reliably prevented. When the total film thickness of the inorganic particle layer 13 and the mixture layer 15 is 30 µm or less, the anode and the cathode are not too far apart, so that an increase in electrical resistance between the anode and the cathode can be much more prevented.

The mixture layer 15 may be formed using an ink for preparing a mixture layer of inorganic particle and porous resin obtained by mixing the insulating inorganic particle used in the mixture layer 14 and a liquid concentrate (described below) for forming a porous resin.

There is no particular limitation on the application apparatus as long as the layer can be formed. Examples thereof include, but are not limited to, printing apparatuses employing spin coating, casting, micro gravure coating, gravure coating, bar coating, roll coating, wire bar coating, dip coating, slit coating, capillary coating, spray coating, nozzle coating, or a printing method such as gravure printing, screen printing, flexographic printing, offset printing, reverse printing, and inkjet printing.

The liquid concentrate for forming a porous resin may contain a polymerizable compound, a photoinitiator, and a solvent. The polymerizable compound is a precursor of a resin for forming a porous structure and may be any resin capable of forming a cross-linked structure by irradiation with light. Examples thereof include, but are not limited to, acrylate resins, methacrylate resins, urethane acrylate resins, vinyl ester resins, unsaturated polyesters, epoxy resins, oxetane resins, vinyl ethers, and resins utilizing an ene-thiol reaction, each described above. Among these, acrylate resins, methacrylate resins, urethane acrylate resins, and vinyl ester resins, which are able to easily form structures by radical polymerization due to their high reactivity, are preferred in terms of productivity.

The liquid concentrate for forming a porous resin may be obtained by mixing the polymerizable compound having a light-curable function and another compound that generates a radical or an acid by light. The polymerizable compound has at least one radical polymerizable functional group. Examples thereof include, but are not limited to, monofunctional, difunctional, and trifunctional or higher radical-polymerizable compounds, functional monomers, and radical-polymerizable oligomers. Among these compounds, difunctional or higher radical-polymerizable compounds are preferable.

Specific examples of the monofunctional radical-polymerizable compounds include, but are not limited to, 2-(2-ethoxyethoxy)ethyl acrylate, methoxypolyethylene glycol monoacrylate, methoxypolyethylene glycol monomethacrylate, phenoxypolyethylene glycol acrylate, 2-acryloyloxyethyl succinate, 2-ethylhexyl acrylate, 2-hydroxyethyl acrylate, 2-hydroxypropyl acrylate, tetrahydrofurfuryl acrylate, 2-ethylhexylcarbitol acrylate, 3-methoxybutyl acrylate, benzyl acrylate, cyclohexyl acrylate, isoamyl acrylate, isobutyl acrylate, methoxytriethylene glycol acrylate, phenoxytetraethylene glycol acrylate, cetyl acrylate, isostearyl acrylate, stearyl acrylate, and styrene monomer. Each of these compounds can be used alone or in combination with others.

Specific examples of the difunctional radical-polymerizable compounds include, but are not limited to, 1,3-butanediol diacrylate, 1,4-butanediol diacrylate, 1,4-butanediol dimethacrylate, 1,6-hexanediol diacrylate, 1,6-hexanediol dimethacrylate, diethylene glycol diacrylate, polyethylene glycol diacrylate, neopentyl glycol diacrylate, EO-modified bisphenol A diacrylate, EO-modified bisphenol F diacrylate, neopentyl glycol diacrylate, and tricyclodecane dimethanol diacrylate. Each of these compounds can be used alone or in combination with others.

Specific examples of the trifunctional radical-polymerizable compounds include, but are not limited to, trimethylolpropane triacrylate (TMPTA), trimethylolpropane trimethacrylate, EO-modified trimethylolpropane triacrylate, PO-modified trimethylolpropane triacrylate, caprolactone-modified trimethylolpropane triacrylate, HPAmodified trimethylolpropane trimethacrylate, pentaerythritol triacrylate, pentaerythritol tetraacrylate (PETTA), glycerol triacrylate, ECH-modified glycerol triacrylate, EO-modified glycerol triacrylate, PO-modified glycerol triacrylate, tris(acryloxyethyl) isocyanurate, dipentaerythritol hexaacrylate (DPHA), caprolactone-modified dipentaerythritol hexaacrylate, dipentaerythritol hydroxypentaacrylate, alkyl-modified dipentaerythritol pentaacrylate, alkyl-modified dipentaerythritol tetraacrylate, alkyl-modified dipentaerythritol triacrylate, dimethylolpropane tetraacrylate (DTMPTA), pentaerythritol ethoxytetraacrylate, EO-modified phosphoric triacrylate, and 2,2,5,5-tetrahydroxymethylcyclopentanone tetraacrylate. Each of these compounds can be used alone or in combination with others.

As the photopolymerization initiator, a photoradical generator may be used.

Examples thereof include, but are not limited to, photoradical polymerization initiators such as Michler's ketone and benzophenone known by the trade names IRGACURE and DAROCUR. Specific preferred examples thereof include, but are not limited to, benzophenone, acetophenone derivatives such as α-hydroxyacetophenone and α-aminoacetophenone, 4-aroyl-1,3-dioxolane, benzyl ketal, 2,2-diethoxyacetophenone, p-dimethylaminoacetophene, pdimethylaminopropiophenone, benzophenone, 2-chlorobenzophenone, pp'-dichlorobenzophenone, pp'-bisdiethylaminobenzophenone, Michler's ketone, benzyl, benzoin, benzyl dimethyl ketal, tetramethylthiuram monosulfide, thioxanthone, 2-chlorothioxanthone, 2-methylthioxanthone, azobisisobutyronitrile, benzoin peroxide, di-tert-butyl peroxide, 1-hydroxycyclohexyl phenyl ketone, 2-hydroxy-2-methyl-1-phenyl-1-one, 1-(4-isopropylphenyl)-2-hydroxy-2-methylpropane-1-one, methyl benzoylformate, benzoin alkyl ethers and esters such as benzoin isopropyl ether, benzoin methyl ether, benzoin ethyl ether, benzoin isobutyl ether, benzoin n-butyl ether, and benzoin n-propyl ether, 1-hydroxy-cyclohexyl-phenyl-ketone, 2-benzyl-2-dimethylamino-1-(4-morpholinophenyl)-butanone-1,1-hydroxy-cyclohexyl-phenyl-ketone, 2,2-dimethoxy-1,2-diphenylethane-1-one, bis($\eta^5$-2,4-cyclopentadiene-1-yl)-bis(2,6-difluoro-3-(1H-pyrrole-1-yl)-phenyl) titanium, bis(2,4,6-trimethylbenzoyl)-phenylphosphine oxide, 2-methyl-1-[4-(methylthio)phenyl]-2-morpholinopropane-1-one, 2-hydroxy-2-methyl-1-phenyl-propane-1-one (DAROCUR 1173), bis(2,6-dimethoxybenzoyl)-2,4,4-trimethyl-pentylphosphine oxide, 1-[4-(2-hydroxyethoxy)-phenyl]-2-hydroxy-2-methyl-1-propane-1-one monoacylphosphine oxide, bisacylphosphine oxide, titanocene, fluorescein, anthraquinone, thioxanthone or xanthone, lophine dimer, trihalomethyl compounds or dihalomethyl compounds, active ester compounds, and organic boron compounds.

Furthermore, a photo-cross-linking radical generator such as a bisazide compound may be used in combination. In the case of accelerating the polymerization by heat, a typical thermal polymerization initiator such as azobisisobutyronitrile (AIBN) that is a typical photoradical generator can be used in combination.

On the other hand, a mixture of a photoacid generator that generates an acid by irradiation with light and at least one monomer that is polymerizable in the presence of an acid achieves a similar function. When such a liquid ink (i.e., mixture) is irradiated with light, the photoacid generator generates an acid, and this acid functions as a catalyst for a cross-linking reaction of the polymerizable compound (i.e., monomer). The generated acid diffuses in the ink layer. The acid diffusion and the acid-catalyzed cross-linking reaction can be accelerated by heating. This cross-linking reaction is not inhibited by the presence of oxygen, unlike radical polymerizations. The resulting resin layer has excellent adhesion property as compared with radical-polymerized resin layers.

Examples of the polymerizable compound cross-linkable in the presence of an acid include, but are not limited to, monomers having a cationically-polymerizable vinyl bond, such as compounds having a cyclic ether group such as epoxy group, oxetane group, and oxolane group, acrylic or vinyl compounds having the above-described substituent on a side chain, carbonate compounds, low-molecular-weight melamine compounds, vinyl ethers and vinylcarbazoles, styrene derivatives, α-methylstyrene derivatives, vinyl alcohol esters such as ester compounds of vinyl alcohols with acrylic acid or methacrylic acid, and combinations thereof.

Examples of the photoacid generator that generates an acid by irradiation with light include, but are not limited to, onium salts, diazonium salts, quinone diazide compounds, organic halides, aromatic sulfonate compounds, bisulfone compounds, sulfonyl compounds, sulfonate compounds, sulfonium compounds, sulfamide compounds, iodonium compounds, sulfonyl diazomethane compounds, and mixtures thereof.

Among these, onium salts are preferred as the photoacid generator. Examples of usable onium salts include, but are not limited to, diazonium salts, phosphonium salts, and sulfonium salts, each having a counter ion such as a fluoroborate anion, a hexafluoroantimonate anion, a hexafluoroarsenate anion, a trifluoromethanesulfonate anion, a p-toluenesulfonate anion, and a p-nitrotoluenesulfonate anion. Examples of the photoacid generator further include halogenated triazine compounds.

The photoacid generator may further contain a sensitizing dye. Examples of the sensitizing dye include, but are not limited to, acridine compounds, benzoflavins, perylene, anthracene, and laser dyes.

Next, the solvent to be used is described. A porous body can be formed by polymerization-induced phase separation. In this case, the polymerizable compound and the compound that generates a radical or an acid by light is previously mixed with the solvent to prepare a mixed liquid. The solvent functions as a porogen that forms a pore region in the porous body during the photopolymerization.

The porogen is arbitrarily selected from liquid substances capable of dissolving the polymerizable compound and the compound that generates a radical or an acid by light and causing phase separation in the process in which the polymerizable compound and the compound that generates a radical or an acid by light get polymerized.

Examples of the porogen include, but are not limited to: ethylene glycols such as diethylene glycol monomethyl ether, ethylene glycol monobutyl ether, and dipropylene glycol monomethyl ether; esters such as γ-butyrolactone and propylene carbonate; and amides such as N,N-dimethylacetamide. Liquid substances having a relatively large molecular weight, such as methyl tetradecanoate, methyl decanoate, methyl myristate, and tetradecane, also tend to function as the porogen. In particular, many ethylene glycols have a high boiling point. In the phase separation mechanism, the structure to be formed largely depends on the concentration of the porogen. When the above-described liquid substance is used, a porous body can be reliably formed. Each of these porogens may be used alone or in combination with others.

The viscosity of the liquid concentrate for forming film is preferably from 1 to 1,000 Pa·s, more preferably from 5 to 200 mPa·s, at 25 degrees C., in consideration of handling property and leveling performance for ensuring printing quality.

Further, the solid content concentration of the polymerizable compound in the liquid concentrate for forming film is preferably from 5% to 70% by mass, more preferably from 10% to 50% by mass. When the concentration of the polymerizable compound is above the above-described range, it is likely that the pore diameter is as small as several tens of nanometers or less and liquids and gases hardly permeate. When the concentration of the polymerizable compound is below the above-described range, it is likely that a three-dimensional network structure is not sufficiently formed in the resin and the strength of the resulting porous body is remarkably lowered.

Figure 11:
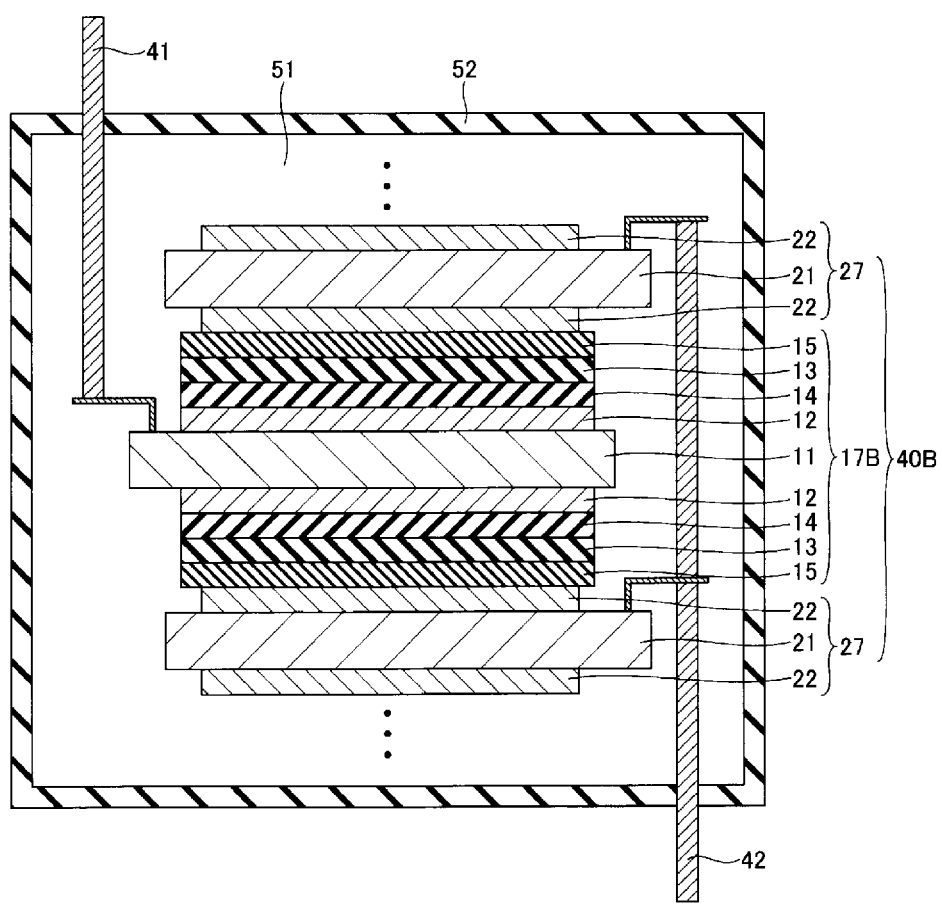
FIG. 11 is a cross-sectional view of the non-aqueous electrolyte power storage element according to the third embodiment.

FIG. 11 is a cross-sectional view of the non-aqueous electrolyte power storage element according to the third embodiment. Referring to FIG. 11, a non-aqueous electrolyte power storage element 1B is different from the non-aqueous electrolyte power storage element 1A (illustrated in FIG. 9) in that the electrode element 40A is replaced with an electrode element 40B.

The electrode element 40B has a structure in which the cathode 27 is stacked on both sides of an anode 17B. The anode 17B is the same as the anode 10B (illustrated in FIGS. 10A and 10B) except that the anode composite layer 12, the mixture layer 14 of anode composite material and inorganic particle, the inorganic particle layer 13, and the mixture layer 15 of inorganic particle and porous resin are formed on both sides of the anode substrate 11.

The number of the anodes 17B and the cathodes 27 stacked in the electrode element 40B can be arbitrarily determined. As an example, the embodiment illustrated in FIG. 11 includes one anode 17B and two cathodes 27, i.e., three layers in total. The number of the stacked layers is not limited to this, and more anodes 17B and cathodes 27 can be stacked. In such cases, the number of the anodes 17B and the number of the cathodes 27 may be the same.

In the non-aqueous electrolyte power storage element 1B, as the mixture layer 15 of inorganic particle and porous resin is provided on the inorganic particle layer 13 of the anode 17B, the effect of improving ionic conduction is exhibited in addition to the effects exhibited by the non-aqueous electrolyte power storage element 1A.

In the third embodiment, the mixture layer 14, the inorganic particle layer 13, and the mixture layer 15 are provided on the anode. However, the present embodiment is not limited thereto, and a mixture layer of cathode composite material and inorganic particle, an inorganic particle layer, and a mixture layer of inorganic particle and porous resin may be provided on the cathode. In this case, it is not necessary to provide the mixture layer 14, the inorganic particle layer 13, and the mixture layer 15 on the anode.

Alternatively, a mixture layer of cathode composite material and inorganic particle, an inorganic particle layer, and a mixture layer of inorganic particle and porous resin may be provided on the cathode, and the mixture layer 14, the inorganic particle layer 13, and the mixture layer 15 may be further provided on the anode. In either of these cases, the same effects as in the third embodiment is exhibited.

In the case of forming a mixture layer of inorganic particle and porous resin on the cathode, the same effect as in the case of forming it on the anode is exhibited when the film thickness thereof is the same.

Preferably, the total film thickness of the inorganic particle layer and the mixture layer of inorganic particle and porous resin is from 1 to 100 μm, more preferably from 3 to 50 μm, and much more preferably from 5 to 30 μm.

When the total film thickness of the inorganic particle layer and the mixture layer of inorganic particle and porous resin is 1 μm or more, a short circuit between the anode and the cathode can be reliably prevented. When the total film thickness of the inorganic particle layer and the mixture layer of inorganic particle and porous resin is 100 μm or less, the anode and the cathode are not too far apart, so that an increase in electrical resistance between the anode and the cathode can be prevented.

When the total film thickness of the inorganic particle layer and the mixture layer of inorganic particle and porous resin is 3 μm or more, a short circuit between the anode and the cathode can be more reliably prevented. When the total film thickness of the inorganic particle layer and the mixture layer of inorganic particle and porous resin is 50 μm or less, the anode and the cathode are not too far apart, so that an increase in electrical resistance between the anode and the cathode can be more prevented.

When the total film thickness of the inorganic particle layer and the mixture layer of inorganic particle and porous resin is 5 μm or more, a short circuit between the anode and the cathode can be much more reliably prevented. When the total film thickness of the inorganic particle layer and the mixture layer of inorganic particle and porous resin is 30 μm or less, the anode and the cathode are not too far apart, so that an increase in electrical resistance between the anode and the cathode can be much more prevented.

Fourth Embodiment

In the fourth embodiment, a porous resin layer is provided on the mixture layer of inorganic particle and porous resin. Note that in the fourth embodiment, descriptions of the same components as those of the above-described embodiments may be omitted.

Figure 12A:
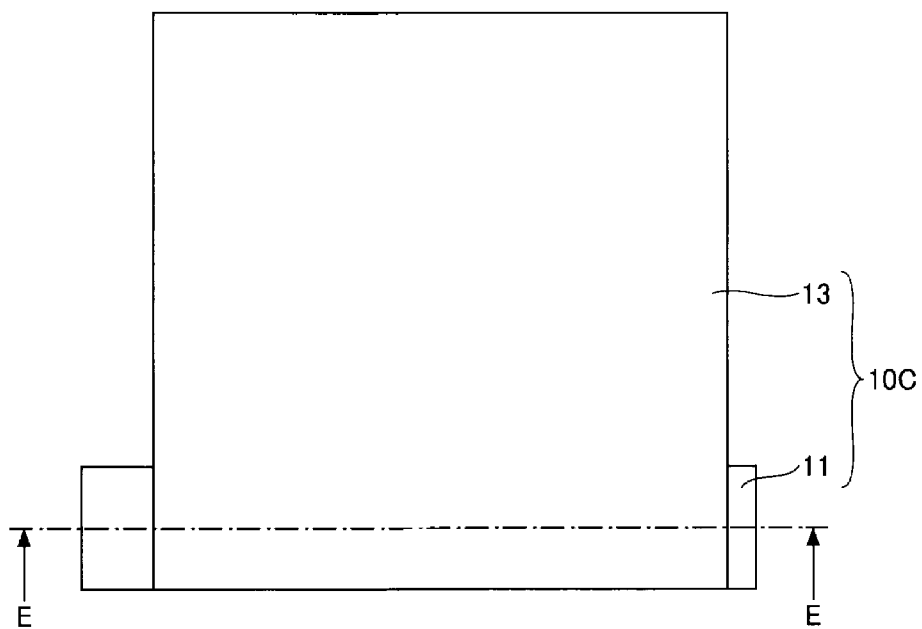
FIGS. 12A and 12B are diagrams illustrating an anode for use in a non-aqueous electrolyte power storage element according to the fourth embodiment.
Figure 12B:
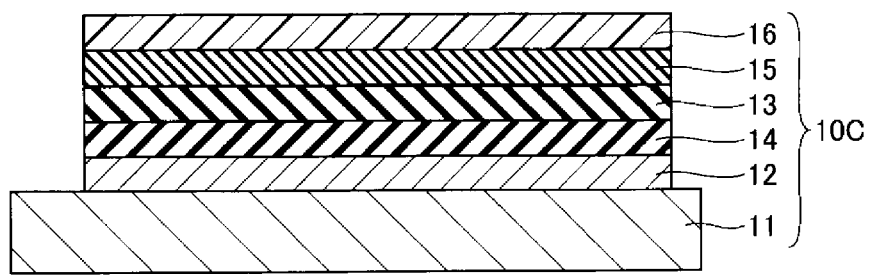

FIG. 12A is a plan view of an anode for use in a non-aqueous electrolyte power storage element according to the fourth embodiment. FIG. 12B is a cross-sectional view of the anode illustrated in FIG. 12A taken along a dotted line E-E.

Referring to FIGS. 12A and 12B, an anode 10C is different from the anode 10B (illustrated in FIGS. 10A and 10B) in that a porous resin layer 16 is formed on the mixture layer 15.

Preferably, the film thickness of the porous resin layer 16 is from 0.1 to 100 μm, more preferably from 3 to 50 μm, and much more preferably from 5 to 30 μm.

When the film thickness of the porous resin layer 16 is 0.1 μm or more, a short circuit between the anode and the cathode can be reliably prevented. When the film thickness of the porous resin layer 16 is 100 μm or less, the anode and the cathode are not too far apart, so that an increase in electrical resistance between the anode and the cathode can be prevented.

When the film thickness of the porous resin layer 16 is 3 μm or more, a short circuit between the anode and the cathode can be more reliably prevented. When the film thickness of the porous resin layer 16 is 50 μm or less, the anode and the cathode are not too far apart, so that an increase in electrical resistance between the anode and the cathode can be more prevented.

When the film thickness of the porous resin layer 16 is 5 μm or more, a short circuit between the anode and the cathode can be much more reliably prevented. When the film thickness of the porous resin layer 16 is 30 μm or less, the anode and the cathode are not too far apart, so that an increase in electrical resistance between the anode and the cathode can be much more prevented.

Preferably, the porosity of the porous resin layer 16 is from 40% to 90%, more preferably from 45% to 85%. When the porosity is small, the amount of retention of electrolyte is small, so that the film thickness should be increased. When the film thickness is large, the distance between the electrodes is large, so that the input/output characteristics are degraded. When the porosity is large, the input/output characteristics are improved because the movement resistance of the electrolyte is reduced. However, when the porosity is too large, the structure becomes brittle and weak against vibration and impact. When the porosity of the porous resin layer 16 is from 40% to 90%, the amount of retention of electrolyte is ensured without increasing the film thickness, and at the same time, the desired input/output characteristics can be achieved while preventing the structure from becoming brittle.

Preferably, the total film thickness of the inorganic particle layer 13, the mixture layer 15, and the porous resin layer 16 is from 1 to 100 μm, more preferably from 3 to 50 μm, and much more preferably from 5 to 30 μm.

When the total film thickness of the inorganic particle layer 13, the mixture layer 15, and the porous resin layer 16 is 1 μm or more, a short circuit between the anode and the cathode can be reliably prevented. When the total film thickness of the inorganic particle layer 13, the mixture layer 15, and the porous resin layer 16 is 100 μm or less, the anode and the cathode are not too far apart, so that an increase in electrical resistance between the anode and the cathode can be prevented.

When the total film thickness of the inorganic particle layer 13, the mixture layer 15, and the porous resin layer 16 is 3 μm or more, a short circuit between the anode and the cathode can be more reliably prevented. When the total film thickness of the inorganic particle layer 13, the mixture layer 15, and the porous resin layer 16 is 50 μm or less, the anode and the cathode are not too far apart, so that an increase in electrical resistance between the anode and the cathode can be more prevented.

When the total film thickness of the inorganic particle layer 13, the mixture layer 15, and the porous resin layer 16 is 5 μm or more, a short circuit between the anode and the cathode can be much more reliably prevented. When the total film thickness of the inorganic particle layer 13, the mixture layer 15, and the porous resin layer 16 is 30 μm or less, the anode and the cathode are not too far apart, so that an increase in electrical resistance between the anode and the cathode can be much more prevented.

The porous resin layer 16 may be formed using an ink for preparing a porous resin layer containing the liquid concentrate for forming a porous resin used in the mixture layer 15 of inorganic particle and porous resin. There is no particular limitation on the application apparatus as long as the layer can be formed. Examples thereof include, but are not limited to, printing apparatuses employing spin coating, casting, micro gravure coating, gravure coating, bar coating, roll coating, wire bar coating, dip coating, slit coating, capillary coating, spray coating, nozzle coating, or a printing method such as gravure printing, screen printing, flexographic printing, offset printing, reverse printing, and inkjet printing. The liquid concentrate for forming a porous resin may contain a polymerizable compound, a photoinitiator, and a solvent. The porous resin in the mixture layer 15 of inorganic particle and porous resin can be used for the porous resin layer 16.

Figure 13:
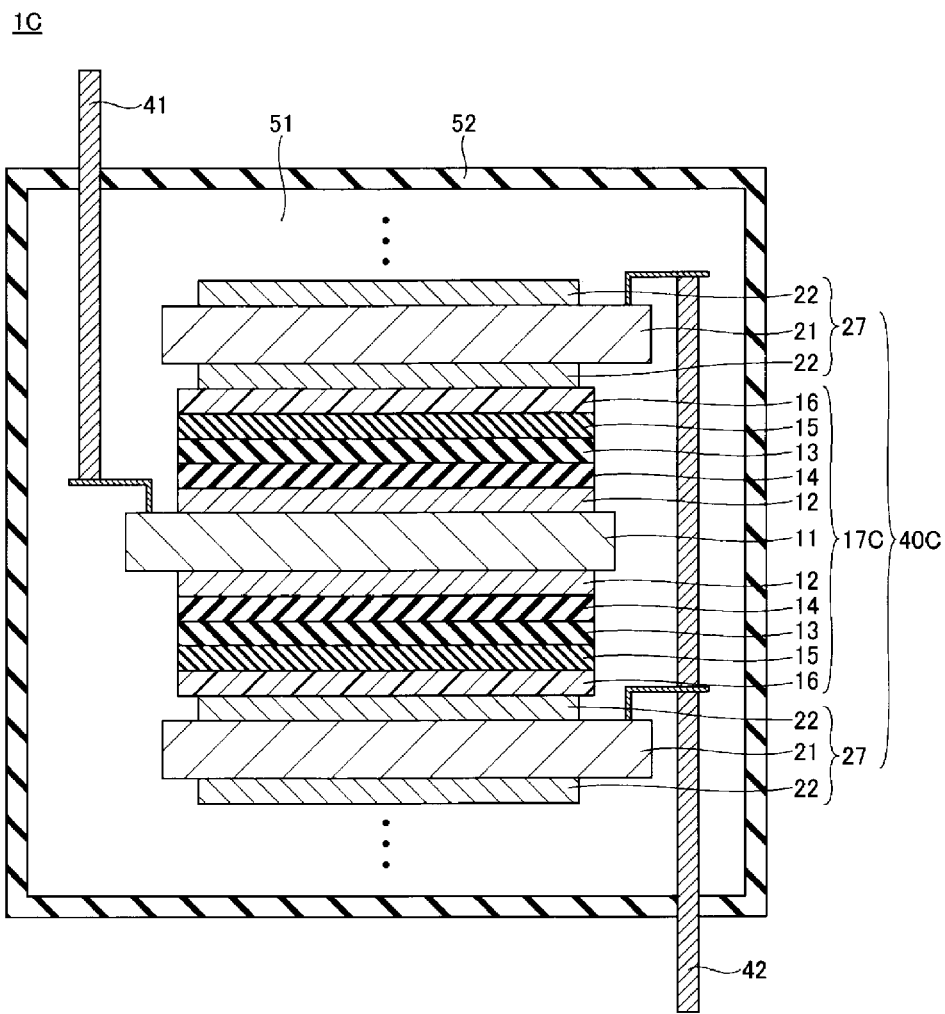
FIG. 13 is a cross-sectional view of the non-aqueous electrolyte power storage element according to the fourth embodiment.

FIG. 13 is a cross-sectional view of the non-aqueous electrolyte power storage element according to the fourth embodiment. Referring to FIG. 13, a non-aqueous electrolyte power storage element 1C is different from the non-aqueous electrolyte power storage element 1B (illustrated in FIG. 11) in that the electrode element 40B is replaced with an electrode element 40C.

The electrode element 40C has a structure in which the cathode 27 is stacked on both sides of an anode 17C. The anode 17C is the same as the anode 10C (illustrated in FIGS. 12A and 12B) except that the anode composite layer 12, the mixture layer 14 of anode composite material and inorganic particle, the inorganic particle layer 13, the mixture layer 15 of inorganic particle and porous resin, and the porous resin layer 16 are formed on both sides of the anode substrate 11.

The number of the anodes 17C and the cathodes 27 stacked in the electrode element 40C can be arbitrarily determined. As an example, the embodiment illustrated in FIG. 13 includes one anode 17C and two cathodes 27, i.e., three layers in total. The number of the stacked layers is not limited to this, and more anodes 17C and cathodes 27 can be stacked. In such cases, the number of the anodes 17C and the number of the cathodes 27 may be the same.

In the non-aqueous electrolyte power storage element 1C, as the porous resin layer 16 is provided on the mixture layer 15 of inorganic particle and porous resin of the anode 17C, the effect of more reliably preventing a short circuit between the anode 17C and the cathode 27 is exhibited in addition to the effects exhibited by the nonaqueous electrolyte power storage element 1B.

In the fourth embodiment, the mixture layer 14, the inorganic particle layer 13, the mixture layer 15, and the porous resin layer 16 are provided on the anode. However, the present embodiment is not limited thereto, and a mixture layer of cathode composite material and inorganic particle, an inorganic particle layer, a mixture layer of inorganic particle and porous resin, and a porous resin layer may be provided on the cathode. In this case, it is not necessary to provide the mixture layer 14, the inorganic particle layer 13, the mixture layer 15, and the porous resin layer 16 on the anode. Alternatively, a mixture layer of cathode composite material and inorganic particle, an inorganic particle layer, a mixture layer of inorganic particle and porous resin, and a porous resin layer may be provided on the cathode, and the mixture layer 14, the inorganic particle layer 13, the mixture layer 15, and the porous resin layer 16 may be further provided on the anode. In either of these cases, the same effects as in the fourth embodiment is exhibited.

In the case of forming a porous resin layer on the cathode, the same effect as in the case of forming it on the anode is exhibited when the film thickness thereof is the same.

Preferably, the total film thickness of the inorganic particle layer, the mixture layer of inorganic particle and porous resin, and the porous resin layer is from 1 to 100 μm, more preferably from 3 to 50 μm, and much more preferably from 5 to 30 μm.

When the total film thickness of the inorganic particle layer, the mixture layer of inorganic particle and porous resin, and the porous resin layer is 1 μm or more, a short circuit between the anode and the cathode can be reliably prevented. When the total film thickness of the inorganic particle layer, the mixture layer of inorganic particle and porous resin, and the porous resin layer is 100 μm or less, the anode and the cathode are not too far apart, so that an increase in electrical resistance between the anode and the cathode can be prevented.

When the total film thickness of the inorganic particle layer, the mixture layer of inorganic particle and porous resin, and the porous resin layer is 3 μm or more, a short circuit between the anode and the cathode can be more reliably prevented. When the total film thickness of the inorganic particle layer, the mixture layer of inorganic particle and porous resin, and the porous resin layer is 50 μm or less, the anode and the cathode are not too far apart, so that an increase in electrical resistance between the anode and the cathode can be more prevented.

When the total film thickness of the inorganic particle layer, the mixture layer of inorganic particle and porous resin, and the porous resin layer is 5 μm or more, a short circuit between the anode and the cathode can be much more reliably prevented. When the total film thickness of the inorganic particle layer, the mixture layer of inorganic particle and porous resin, and the porous layer is 30 μm or less, the anode and the cathode are not too far apart, so that an increase in electrical resistance between the anode and the cathode can be much more prevented.

First Modification of Fourth Embodiment In the first modification of the fourth embodiment, a separator is provided between the cathode and the anode. Note that in the first modification the fourth embodiment, descriptions of the same components as those of the above-described embodiments may be omitted.

Figure 14:
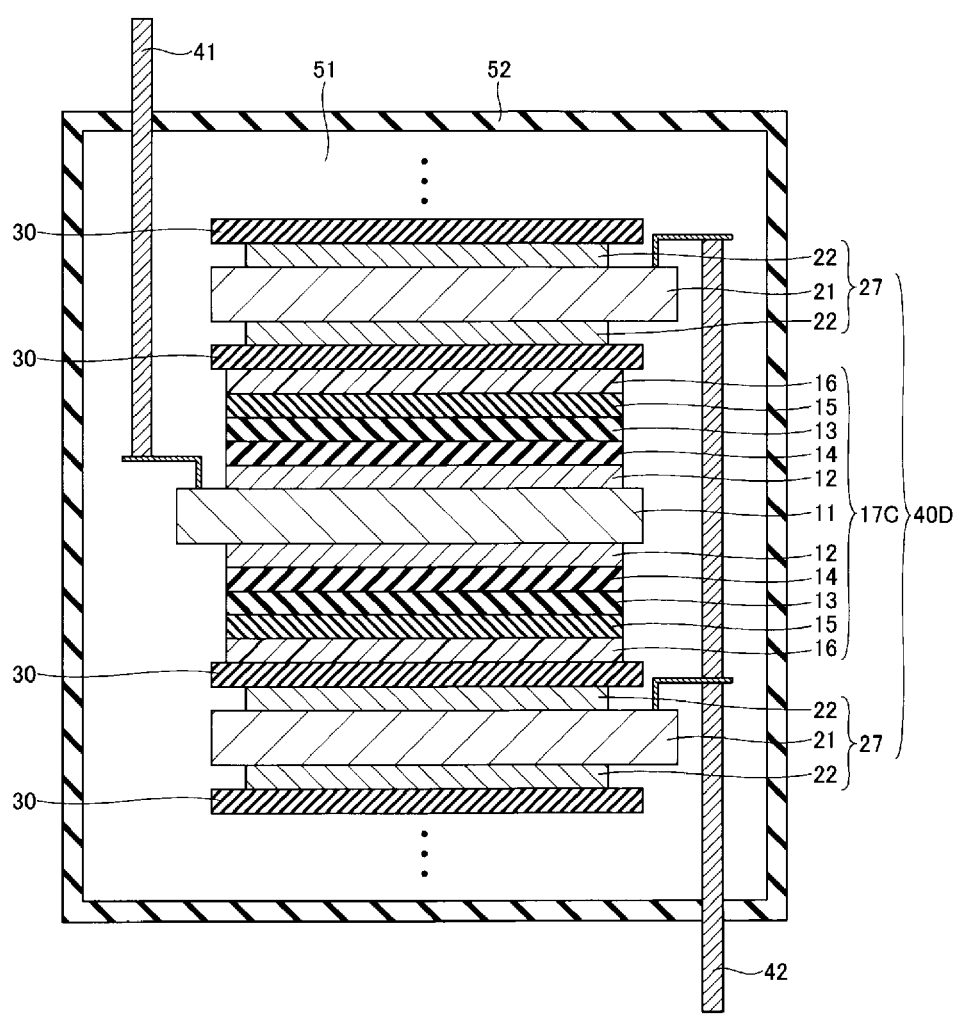
FIG. 14 is a cross-sectional view of a non-aqueous electrolyte power storage element according to the first modification of the fourth embodiment.

FIG. 14 is a cross-sectional view of the non-aqueous electrolyte power storage element according to the first modification of the fourth embodiment. Referring to FIG. 14, a non-aqueous electrolyte power storage element 1D is different from the non-aqueous electrolyte power storage element 1C (illustrated in FIG. 13) in that the electrode element 40C is replaced with an electrode element 40D.

The electrode element 40D has a structure in which the cathode 27 is stacked on both sides of the anode 17C with the separator 30 interposed therebetween.

In the electrode element 40C of the non-aqueous electrolyte power storage element 1C illustrated in FIG. 13, a separator is not necessary because the inorganic particle layer 13, the mixture layer 14, and the porous resin layer 16 of the anode 17C prevent a short circuit between the anode 17C and the cathode 27. On the other hand, as in the electrode element 40D of the non-aqueous electrolyte power storage element 1D illustrated in FIG. 14, the separator 30 may be interposed between the anode 17C and the cathode 27 to more reliably prevent a short circuit between the anode 17C and the cathode 27, as necessary.

The number of the anodes 17C and the cathodes 27 stacked via the separators 30 in the electrode element 40D can be arbitrarily determined. As an example, the embodiment illustrated in FIG. 14 includes one anode 17C and two cathodes 27, i.e., three layers in total. The number of the stacked layers is not limited to this, and more anodes 17C and cathodes 27 can be stacked. In such cases, the number of the anodes 17C and the number of the cathodes 27 may be the same.

Further understanding can be obtained by reference to certain specific examples of the non-aqueous electrolyte power storage element which are provided herein for the purpose of illustration only and are not intended to be limiting. In the following descriptions, "parts" and "%" are based on mass unless otherwise specified.

First, the procedures for synthesizing polymer dispersants 1 to 7 including a polymer used in some Examples are described below.

Synthesis of Polymer Dispersant 1

First, 100 parts of 2-[2-(2-methoxyethoxy)ethoxy]ethyl acrylate (manufactured by Tokyo Chemical Industry Co., Ltd.) and 5 parts of acrylic acid (manufactured by Tokyo Chemical Industry Co., Ltd.) were dissolved in 100 parts of dioxane. Next, 0.1 part of 2,2'-azobis(2-methylpropionitrile) were added thereto and stirred at 75 degrees C. for 8 hours in a nitrogen atmosphere to cause a polymerization. After the polymerization was completed, a vacuum drying was performed. Thus, a polymer dispersant 1 having a number average molecular weight of 5,000 was prepared.

Synthesis of Polymer Dispersant 2

First, 105 parts of the polymer dispersant 1 were dissolved in 100 parts of dioxane. Next, an aqueous solution containing 1.3 parts of ammonia was added thereto and stirred at 100 degrees C. for 2 hours to cause a reaction. After the reaction was completed, a vacuum drying was performed. Thus, a polymer dispersant 2 was prepared.

Synthesis of Polymer Dispersant 3

First, 105 parts of the polymer dispersant 1 were dissolved in 100 parts of dioxane. Next, an aqueous solution containing 3.1 parts of sodium hydroxide was added thereto and stirred at 100 degrees C. for 2 hours to cause a reaction. After the reaction was completed, a vacuum drying was performed. Thus, a polymer dispersant 3 was prepared.

Synthesis of Polymer Dispersant 4

First, 100 parts of stearyl acrylate (manufactured by Tokyo Chemical Industry Co., Ltd.) and 5 parts of acrylic acid (manufactured by Tokyo Chemical Industry Co., Ltd.) were dissolved in 100 parts of dioxane. Next, 0.1 part of 2,2'-azobis(2-methylpropionitrile) were added thereto and stirred at 75 degrees C. for 8 hours in a nitrogen atmosphere to cause a polymerization. After the polymerization was completed, a vacuum drying was performed. Thus, a polymer dispersant 4 having a number average molecular weight of 5,000 was prepared.

Synthesis of Polymer Dispersant 5

Under a nitrogen atmosphere, 40 parts by mass of L-aspartic acid (manufactured by Tokyo Chemical Industry Co., Ltd.) were added to 400 parts by mass of sulfolane (manufactured by Tokyo Chemical Industry Co., Ltd.) and stirred for 12 hours. After the stirring, 1.5 parts by mass of phosphoric acid (manufactured by FUJIFILM Wako Pure Chemical Corporation) were added thereto and stirred at 180 degrees C. for 12 hours, and then 1,000 parts by mass of methanol were added thereto, thus obtaining a precipitate. After vacuum-filtering the precipitate, the resulted solid was washed with ion-exchange water until the supernatant liquid neutral, then vacuum-filtered and vacuum-dried. Thus, a precursor of a polymer dispersant 5 was prepared.

Under a nitrogen atmosphere, 10 parts by mass of the above-prepared precursor and 6 parts by mass of 3,6,9,12-tetraoxadecanamine (manufactured by Tokyo Chemical Industry Co., Ltd.) were added to 250 parts by mass of dimethylformamide (manufactured by Tokyo Chemical Industry Co., Ltd.) and heat-stirred at 70 degrees C. for 24 hours. After the heat-stirring was completed, the reaction liquid was cooled to 30 degrees C. and added dropwise to 500 parts by mass of 1N ammonia water. After the dropwise addition was completed, the reaction liquid was stirred for 12 hours and vacuum-dried. Thus, a polymer dispersant 5 having a number average molecular weight of 10,000 was prepared.

Synthesis of Polymer Dispersant 6

First, 100 parts of 2-[2-(2-methoxyethoxy)ethoxy]ethyl acrylate (manufactured by Tokyo Chemical Industry Co., Ltd.) and 5 parts of vinylsulfonic acid (manufactured by Tokyo Chemical Industry Co., Ltd.) were dissolved in 100 parts of dioxane. Next, 0.1 part of 2,2'-azobis(2-methylpropionitrile) were added thereto and stirred at 75 degrees C. for 8 hours in a nitrogen atmosphere to cause a polymerization. After the polymerization was completed, a vacuum drying was performed. Thus, a polymer dispersant 6 having a number average molecular weight of 5,000 was prepared.

Synthesis of Polymer Dispersant 7

First, 100 parts of 2-[2-(2-methoxyethoxy)ethoxy]ethyl acrylate (manufactured by Tokyo Chemical Industry Co., Ltd.) and 5 parts of vinylphosphonic acid (manufactured by Tokyo Chemical Industry Co., Ltd.) were dissolved in 100 parts of dioxane. Next, 0.1 part of 2,2'-azobis(2-methylpropionitrile) were added thereto and stirred at 75 degrees C. for 8 hours in a nitrogen atmosphere to cause a polymerization. After the polymerization was completed, a vacuum drying was performed. Thus, a polymer dispersant 7 having a number average molecular weight of 5,000 was prepared.

Example 1

An electrode paint for forming an anode composite layer was prepared by mixing 97 parts by mass of graphite, 1 part by mass of a thickener (carboxymethyl cellulose), 2 parts by mass of a binder (styrene butadiene rubber), and 100 parts by mass of water as a solvent. The electrode paint was applied onto both sides of an anode substrate made of copper and dried to form an anode composite layer on each side. The amount of application per unit area (area density) was 9 mg/cm$^2$ on each side.

Next, a coating ink for forming an inorganic particle layer was prepared by mixing 30 parts by mass of alumina particles AKP-3000 (manufactured by Sumitomo Chemical Co., Ltd.), 0.675 parts by mass of a polymer MALIALIM HKM-50A (i.e., a copolymer of ammonium fumarate and a monomer having a side chain having an oxyalkylene group or a polyoxyalkylene group, manufactured by NOF CORPORATION), 50 parts by mass of propylene glycol as an organic solvent, and 19.7 parts by mass of water.

Median Diameter of Core-Shell Particle (D50)

The ink was sonicated for 3 minutes using an ultrasonic homogenizer US-300T (manufactured by NIHONSEIKI KAISHA LTD.). The ink was then diluted with ion-exchange water until the concentration became optically measurable, and the median diameter (D50) of particles contained in the ink (or mixed liquid thereof) was measured using a laser diffraction particle size distribution meter MASTERSIZER 3000 (manufactured by Malvern Panalytical Ltd.).

Measurement of Zeta Potential of Core-Shell Particle

To measure the zeta potential, the dispersion liquid diluted to have a concentration within an optically-measurable region was subjected to a measurement with an instrument ELS-Z (manufactured by Otsuka Electronics Co., Ltd.).

Note that, since the film thickness of the shell of the core-shell particle in each Example is very thin, quantitative measurement thereof is difficult. Therefore, in the Examples, formation of the core-shell particles was confirmed by monitoring fluctuation of the zeta potential (the state of reverse charging with respect to the surface potential of the insulating inorganic particle) with reference to the description in Macromolecules, 1999, 32, 2317-2328 (or J. Am. Ceram. Soc., 1998, 81, 140).

Specifically, the insulating inorganic particle and the polymer are mixed in ion-exchange water, optionally followed by a dispersion treatment. The resulted dispersion liquid is appropriately diluted and subjected to a measurement of the zeta potential. By this procedure, a decrease of the zeta potential is observed until the zeta potential reaches the neutralization point with respect to the surface potential of the insulating inorganic particle (for example, alumina particles are positively charged near the neutral region) by addition of the polymer. After reaching the neutralization point, the zeta potential increases in the opposite charge direction, and the process of forming a core-shell particle is observed.

For example, in the case of alumina (AKP3000 manufactured by Sumitomo Chemical Co., Ltd.), the zeta potential is +50 mV under neutral conditions. Therefore, when the zeta potential of the core-shell particle containing alumina as the core is in the range of from +50 to 0 mV or is a negative value, it can be confirmed that the coreshell particle has a core-shell structure having the shell made of a polymer having a charge opposite to the surface potential of alumina.

The coating ink was applied onto one of the anode composite layers with an inkjet apparatus and dried to form an inorganic particle layer having a weight per unit area of 1.3 mg/cm$^2$ (a thickness of 6.5 μm). In the same way, an inorganic particle layer was formed on the other one of the anode composite layers under the same coating conditions (i.e., a weight per unit area of 1.3 mg/cm$^2$ and a thickness of about 6.5 μm).

Thus, an electrode was prepared in which the anode composite layer and the inorganic particle layer were sequentially stacked on both sides of the anode substrate. The electrode was punched into a specific size (coated surface: 30 mm×50 mm, uncoated surface: 10 mm×11 mm) to produce an anode.

An electrode paint for forming a cathode composite layer was prepared by mixing 93 parts by mass of lithium-nickel cobalt aluminum composite oxide (NCA), 3 parts by mass of a conductive auxiliary agent, 4 parts by mass of a binder (polyvinylidene fluoride), and 100 parts by mass of N-methylpyrrolidone as a solvent. The electrode paint was applied onto both sides of a cathode substrate made of aluminum and dried to form a cathode composite layer on each side. The amount of application per unit area (area density) was 15.0 mg/cm$^2$ on each side.

The electrode was punched into a specific size (coated surface: 28 mm×48 mm, uncoated surface: 10 mm×13 mm) to produce a cathode. No inorganic particle layer was provided on the cathode.

The above-prepared cathode and anode were alternately laminated with a film separator interposed therebetween until the lamination thickness became about 10 mm to form an electrode element. The uncoated portions of the anodes were gathered and welded with a nickel tab to form an anode lead wire, and the uncoated portions of the cathodes were gathered and welded with an aluminum tab to form a cathode lead wire. The electrode element was then made to contain a 1.5 M non-aqueous electrolyte solution of LiPF$_6$ in a mixed solvent of EC, DNC, and EMC (EC:DMC:EMC=1:1:1) and sealed with an aluminum laminate film. Thus, a non-aqueous electrolyte power storage element was prepared.

Initial Charging and Initial Capacity Measurement

The cathode lead wire and the anode lead wire of the non-aqueous electrolyte power storage element as prepared above were connected to a charge/discharge test apparatus, and a constant-current constant-voltage charging was performed for 5 hours at a maximum voltage of 4.2 V and a current rate of 0.2 C. After completion of the charging, the non-aqueous electrolyte power storage element was left to stand in a thermostatic chamber at 40 degrees C. for 5 days. After that, a constant-current discharging was performed to 2.5 V at a current rate of 0.2 C. After that, a constant-current constant-voltage charging was performed for 5 hours at a maximum voltage of 4.2 V and a current rate of 0.2 C, followed by a pause for 10 minutes, and then a constant-current discharging was performed to 2.5 V at a current rate of 0.2 C. The discharge capacity at this time was defined as the initial capacity.

Output Density Evaluation Test: Evaluation 1

The cathode lead wire and the anode lead wire of the non-aqueous electrolyte power storage element whose initial capacity had been measured as above were connected to a charge/discharge test apparatus, and a charging was performed for 5 hours at a maximum voltage of 4.2 V and a current rate of 0.2 C. After a pause for 10 minutes, a constant-current discharging was performed for 2.5 hours at a current rate of 0.2 C to make the charging depth of the non-aqueous electrolyte power storage element be 50%. Next, a pulse with a current rate of from 1 to 10 C was discharged for 10 seconds, a power for the 2.5 V cutoff voltage was calculated from the correlation line between the post-pulse voltage and the current value, and the output density (Wh/kg) was calculated by division with the cell weight. As a result, the output density was 3,150 Wh/kg.

Evaluation Criteria

Good: The relative value is 70% or more with respect to the power density in Example 1 being 100%.

Poor: The relative value is less than 70% with respect to the power density in Example 1 being 100%.

Peel Strength Test: Evaluation 2

The peel strength of the electrode having the inorganic particle layer formed thereon was measured. In the measurement, a piece of cellophane tape was attached to the surface of the electrode and then peeled off at a peeling angle of 90 degrees to measure the peel strength (N). As a result, the peel strength was 0.45 N.

Evaluation Criteria

Good: The relative value is 70% or more with respect to the peel strength in Example 1 being 100%.

Poor: The relative value is less than 70% with respect to the peel strength in Example 1 being 100%.

Calculation of Sheet Resistance of Inorganic Particle Layer

The non-aqueous electrolyte power storage element of Example 1 was subjected to a constant-current constant-voltage charging for 5 hours at a maximum voltage of 4.2 V and a current rate of 0.2 C. After completion of the charging, the non-aqueous electrolyte power storage element was left to stand in a thermostatic chamber at 40 degrees C. for 5 days. After that, a constant-current discharging was performed to 2.5 V at a current rate of 0.2 C. After that, a constant-current constant-voltage charging was performed for 5 hours at a maximum voltage of 4.2 V and a current rate of 0.2 C, followed by a pause for 10 minutes, and then a constant-current discharging was performed to 2.5 V at a current rate of 0.2 C. Next, the impedance within a range of from 100 to 0.01 kΩ was measured to obtain the Cole-Cole Plot. The sheet resistance AI was calculated by the formula AI=A(Ω)×S (cm$^2$), where A(Ω) represents the intersection of the Cole-Cole Plot and the real axis and S (cm$^2$) represents the total area in which the cathode and the anode are facing each other.

Next, a non-aqueous electrolyte power storage element was prepared in the same manner as above except for forming no inorganic particle layer. This non-aqueous electrolyte power storage element was subjected to a constant-current constant-voltage charging for 5 hours at a maximum voltage of 4.2 V and a current rate of 0.2 C. After completion of the charging, the non-aqueous electrolyte power storage element was left to stand in a thermostatic chamber at 40 degrees C. for 5 days. After that, a constant-current discharging was performed to 2.5 V at a current rate of 0.2 C. After that, a constant-current constant-voltage charging was performed for 5 hours at a maximum voltage of 4.2 V and a current rate of 0.2 C, followed by a pause for 10 minutes, and then a constant-current discharging was performed to 2.5 V at a current rate of 0.2 C. Next, the impedance within a range of from 100 to 0.01 kΩ was measured to obtain the Cole-Cole Plot. The sheet resistance REF was calculated by the formula REF=B(Ω)×S (cm$^2$), where B(Ω) represents the intersection of the Cole-Cole Plot and the real axis and S (cm$^2$) represents the total area in which the cathode and the anode are facing each other.

Furthermore, the sheet resistance (Ω·cm$^2$) of the inorganic particle layer was obtained by the formula AI–REF, i.e., subtracting the sheet resistance REF from the sheet resistance AI. As a result, the sheet resistance of the inorganic particle layer of Example 1 was 0.22 Ω·cm$^2$.

Example 2

An anode and a cathode were prepared in the same manner as in Example 1 except that the amount of the polymer was changed to 0.3 parts by mass in forming the inorganic particle layer. A non-aqueous electrolyte power storage element was then prepared in the same manner as in Example 1, and Evaluations 1 and 2 were performed. The results are shown in FIG. 15.

Example 3

An anode and a cathode were prepared in the same manner as in Example 1 except that the amount of the polymer was changed to 0.15 parts by mass in forming the inorganic particle layer. A non-aqueous electrolyte power storage element was then prepared in the same manner as in Example 1, and Evaluations 1 and 2 were performed. The results are shown in FIG. 15.

Example 4

An anode and a cathode were prepared in the same manner as in Example 1 except that the amount of the polymer was changed to 0.9 parts by mass in forming the inorganic particle layer. A non-aqueous electrolyte power storage element was then prepared in the same manner as in Example 1, and Evaluations 1 and 2 were performed. The results are shown in FIG. 15.

Example 5

An anode and a cathode were prepared in the same manner as in Example 1 except that the amount of the polymer was changed to 1.2 parts by mass in forming the inorganic particle layer. A non-aqueous electrolyte power storage element was then prepared in the same manner as in Example 1, and Evaluations 1 and 2 were performed. The results are shown in FIG. 15.

Example 6

An anode and a cathode were prepared in the same manner as in Example 1 except that the amount of the polymer was changed to 1.5 parts by mass in forming the inorganic particle layer. A non-aqueous electrolyte power storage element was then prepared in the same manner as in Example 1, and Evaluations 1 and 2 were performed. The results are shown in FIG. 15.

Description of Examples 1 to 6

In each of Examples 1 to 6, a polymer was used in forming the inorganic particle layer. As shown in FIG. 15, the evaluation results for output characteristics and peel strength were good when the proportion of the polymer to the inorganic particle was in the range of from 0.5% to 5% by mass in the inorganic particle layer. When the proportion of the polymer was 3% by mass or more, the output characteristics tended to slightly lower.

Comparative Example 1

An anode and a cathode were prepared in the same manner as in Example 1 except that the polymer was replaced with 0.3 parts by mass of an acrylic binder (manufactured by Zeon Corporation) in the coating ink for forming an inorganic particle layer. A non-aqueous electrolyte power storage element was then prepared in the same manner as in Example 1, and Evaluations 1 and 2 were performed. The results are shown in FIG. 16 together with the results of Example 1. In addition, the sheet resistance of the inorganic particle layer of Comparative Example 1, measured in the same manner as in Example 1, was 5.2 Ω·cm$^2$.

Comparison of Comparative Example 1 with Example 1

In Comparative Example 1, the acrylic binder was used in place of the polymer. The results shown in FIG. 16 indicate that the inorganic particles were firmly bonded to each other with a small addition amount of the acrylic binder. On the other hand, the output characteristics were lowered. The is presumably because the acrylic binder inhibited ionic conductivity in the inorganic particle layer. Moreover, the sheet resistance was larger than that of Example 1. It was found from the measurement of impedance that the sheet resistance of the inorganic particle layer of Comparative Example 1 was high.

Comparative Example 2

An anode and a cathode were prepared in the same manner as in Example 1 except that the amount of the polymer was changed to 0.12 parts by mass in forming the inorganic particle layer. A non-aqueous electrolyte power storage element was then prepared in the same manner as in Example 1, and Evaluations 1 and 2 were performed. The results of Comparative Example 2 are shown in FIG. 17 together with the results of Example 3.

Comparison of Comparative Example 2 with Example 3

In Comparative Example 2, the proportion of the polymer to the inorganic particle was 0.4% by mass. In this case, as shown in FIG. 17, the peel strength of the electrode was small and below the criteria. This is presumably because the proportion of the polymer to the inorganic particle was too small to bond the inorganic particles.

Comparative Example 3

An anode and a cathode were prepared in the same manner as in Example 1 except that the amount of the polymer was changed to 1.8 parts by mass in forming the inorganic particle layer. A non-aqueous electrolyte power storage element was then prepared in the same manner as in Example 1, and Evaluations 1 and 2 were performed. The results of Comparative Example 3 are shown in FIG. 18 together with the results of Example 6.

Comparison of Comparative Example 3 with Example 6

In Comparative Example 3, the proportion of the polymer to the inorganic particle was 6.0% by mass. In this case, as shown in FIG. 18, the output characteristics were small and below the criteria. This is presumably because part of the polymer could not be adsorbed to the surface of the inorganic particles and soaked into the electrode composite layer to cover the active material, and thus lowering ion diffusibility.

Example 7

An anode and a cathode were prepared in the same manner as in Example 1 except that the amounts of the polymer and the acrylic binder were changed to 0.45 parts by mass and 0.03 parts by mass, respectively, in forming the inorganic particle layer. A non-aqueous electrolyte power storage element was then prepared in the same manner as in Example 1, and Evaluations 1 and 2 were performed. The results are shown in FIG. 19.

Example 8

An anode and a cathode were prepared in the same manner as in Example 1 except that the amounts of the polymer and the acrylic binder were changed to 0.3 parts by mass and 0.06 parts by mass, respectively, in forming the inorganic particle layer. A non-aqueous electrolyte power storage element was then prepared in the same manner as in Example 1, and Evaluations 1 and 2 were performed. The results are shown in FIG. 19.

Example 9

An anode and a cathode were prepared in the same manner as in Example 1 except that the amounts of the polymer and the acrylic binder were changed to 0.15 parts by mass and 0.075 parts by mass, respectively, in forming the inorganic particle layer. A non-aqueous electrolyte power storage element was then prepared in the same manner as in Example 1, and Evaluations 1 and 2 were performed. The results are shown in FIG. 19.

Example 10

An anode and a cathode were prepared in the same manner as in Example 1 except that the amounts of the polymer and the acrylic binder were changed to 0.06 parts by mass and 0.09 parts by mass, respectively, in forming the inorganic particle layer. A non-aqueous electrolyte power storage element was then prepared in the same manner as in Example 1, and Evaluations 1 and 2 were performed. The results are shown in FIG. 19.

Description of Examples 7 to 10

In each of Examples 7 to 10, a polymer and a binder were used in combination for forming the inorganic particle layer. As shown in FIG. 19, the evaluation results for both output characteristics and peel strength were good.

Comparative Example 4

An anode and a cathode were prepared in the same manner as in Example 1 except that the amount of the acrylic binder was changed to 0.45 parts by mass in forming the inorganic particle layer. A non-aqueous electrolyte power storage element was then prepared in the same manner as in Example 1, and Evaluations 1 and 2 were performed. The results are shown in FIG. 20 together with the results of Example 1 and Comparative Example 1.

Comparative Example 5

An anode and a cathode were prepared in the same manner as in Example 1 except that the amount of the acrylic binder was changed to 0.15 parts by mass in forming the inorganic particle layer. A non-aqueous electrolyte power storage element was then prepared in the same manner as in Example 1, and Evaluations 1 and 2 were performed. The results are shown in FIG. 20 together with the results of Example 1 and Comparative Example 1.

Comparative Example 6

An anode and a cathode were prepared in the same manner as in Example 1 except that the amount of the acrylic binder was changed to 0.12 parts by mass in forming the inorganic particle layer. A non-aqueous electrolyte power storage element was then prepared in the same manner as in Example 1, and Evaluations 1 and 2 were performed. The results are shown in FIG. 20 together with the results of Example 1 and Comparative Example 1.

Comparison of Comparative Examples 1, 4, and 5 with Example 1

In each of Comparative Examples 1, 4, and 5, the acrylic binder was used in place of the polymer. As shown in FIG. 20, as the addition amount of the acrylic binder was increased, the peel strength of the electrode was increased and came to meet the criteria. However, the output characteristics were decreased without meeting the criteria under any condition.

Comparison of Comparative Example 6 with Example 1

In Comparative Example 6, the acrylic binder was used in place of the polymer. As shown in FIG. 20, the output characteristics met the criteria, but the electrode strength did not meet the criteria. This is probably because the addition amount of the acrylic binder was too small.

Example 11

An anode and a cathode were prepared in the same manner as in Example 1 except that the weight per unit area of the inorganic particle layer was changed to 0.8 mg/cm$^2$ (so as to have a film thickness of 3.5 μm) in forming the inorganic particle layer. A non-aqueous electrolyte power storage element was then prepared in the same manner as in Example 1, and Evaluations 1 and 2 were performed. The results are shown in FIG. 21 together with the results of Example 1. In addition, the sheet resistance of the inorganic particle layer of Example 11, measured in the same manner as in Example 1, was 0.11 Ω·cm$^2$.

Example 12

An anode and a cathode were prepared in the same manner as in Example 1 except that the weight per unit area of the inorganic particle layer was changed to 0.6 mg/cm$^2$ (so as to have a film thickness of 2.6 μm) in forming the inorganic particle layer. A non-aqueous electrolyte power storage element was then prepared in the same manner as in Example 1, and Evaluations 1 and 2 were performed. The results are shown in FIG. 21 together with the results of Example 1. In addition, the sheet resistance of the inorganic particle layer of Example 12, measured in the same manner as in Example 1, was 0.05 Ω·cm$^2$.

Example 13

An anode and a cathode were prepared in the same manner as in Example 1 except that the weight per unit area of the inorganic particle layer was changed to 2.6 mg/cm$^2$ (so as to have a film thickness of 15 μm) in forming the inorganic particle layer. A non-aqueous electrolyte power storage element was then prepared in the same manner as in Example 1, and Evaluations 1 and 2 were performed. The results are shown in FIG. 21 together with the results of Example 1. In addition, the sheet resistance of the inorganic particle layer of Example 13, measured in the same manner as in Example 1, was 0.43 Ω·cm$^2$.

Example 14

An anode and a cathode were prepared in the same manner as in Example 1 except that the weight per unit area of the inorganic particle layer was changed to 5.0 mg/cm$^2$ (so as to have a film thickness of 30 μm) in forming the inorganic particle layer. A non-aqueous electrolyte power storage element was then prepared in the same manner as in Example 1, and Evaluations 1 and 2 were performed. The results are shown in FIG. 21 together with the results of Example 1. In addition, the sheet resistance of the inorganic particle layer of Example 14, measured in the same manner as in Example 1, was 0.81 Ω·cm$^2$.

Description of Examples 1 and 11 to 14

In each of Examples 1 and 11 to 14, the weight per unit area (film thickness) of the inorganic particle layer was changed, and Evaluations 1 and 2 were performed. As shown in FIG. 21, the output characteristics did not change very much. Usually, when the film thickness is increased, the distance between the cathode and the anode is increased, and the output characteristics are remarkably deteriorated. However, the results of these Examples were contrary to that fact. This is presumably because the polymer did not inhibit lithium ion conduction in the inorganic particle layer and was able to exhibit the lithium ion conducting function on the surface of the inorganic particle. Thus, the increase in resistance due to the thickening of the inorganic particle layer can be minimized. Although the sheet resistance of the inorganic particle layer was increasing with the increase in thickness of the inorganic particle layer, it was confirmed that the sheet resistance was 1.0 Ω·cm$^2$ or less under any condition.

Example 15

An anode and a cathode were prepared in the same manner as in Example 1 except that the polymer was replaced with the polymer dispersant 1 in forming the inorganic particle layer. A non-aqueous electrolyte power storage element was then prepared in the same manner as in Example 1, and Evaluations 1 and 2 were performed. The results are shown in FIG. 22 together with the results of Example 1.

Example 16

An anode and a cathode were prepared in the same manner as in Example 1 except that the polymer was replaced with the polymer dispersant 2 in forming the inorganic particle layer. A non-aqueous electrolyte power storage element was then prepared in the same manner as in Example 1, and Evaluations 1 and 2 were performed. The results are shown in FIG. 22 together with the results of Example 1.

Example 17

An anode and a cathode were prepared in the same manner as in Example 1 except that the polymer was replaced with the polymer dispersant 3 in forming the inorganic particle layer. A non-aqueous electrolyte power storage element was then prepared in the same manner as in Example 1, and Evaluations 1 and 2 were performed. The results are shown in FIG. 22 together with the results of Example 1.

Example 18

An anode and a cathode were prepared in the same manner as in Example 1 except that the polymer was replaced with the polymer dispersant 4 in forming the inorganic particle layer. A non-aqueous electrolyte power storage element was then prepared in the same manner as in Example 1, and Evaluations 1 and 2 were performed. The results are shown in FIG. 22 together with the results of Example 1.

Example 19

An anode and a cathode were prepared in the same manner as in Example 1 except that the polymer was replaced with the polymer dispersant 5 in forming the inorganic particle layer. A non-aqueous electrolyte power storage element was then prepared in the same manner as in Example 1, and Evaluations 1 and 2 were performed. The results are shown in FIG. 22 together with the results of Example 1.

Example 20

An anode and a cathode were prepared in the same manner as in Example 1 except that the polymer was replaced with the polymer dispersant 6 in forming the inorganic particle layer. A non-aqueous electrolyte power storage element was then prepared in the same manner as in Example 1, and Evaluations 1 and 2 were performed. The results are shown in FIG. 22 together with the results of Example 1.

Example 21

An anode and a cathode were prepared in the same manner as in Example 1 except that the polymer was replaced with the polymer dispersant 7 in forming the inorganic particle layer. A non-aqueous electrolyte power storage element was then prepared in the same manner as in Example 1, and Evaluations 1 and 2 were performed. The results are shown in FIG. 22 together with the results of Example 1.

Description of Examples 15 to 21

In each of Examples 15 to 21, the type of polymer contained in the inorganic particle layer was changed, and Evaluations 1 and 2 were performed. As shown in FIG. 22, both the output characteristics and the electrode strength met the evaluation criteria. It was confirmed that the polymer dispersants 1 to 7 exhibit the same effects as in Example 1.

Example 22

An electrode paint for forming an anode composite layer was prepared by mixing 97 parts by mass of graphite, 1 part by mass of a thickener (carboxymethyl cellulose), 2 parts by mass of a binder (styrene butadiene rubber), and 100 parts by mass of water as a solvent. The electrode paint was applied onto both sides of an anode substrate made of copper and dried to form an anode composite layer on each side. The amount of application per unit area (area density) was 9 mg/cm$^2$ on each side.

Next, a coating ink for forming a first mixture layer of anode composite material and inorganic particle was prepared by mixing 40 parts by mass of the above-prepared electrode paint, 20 parts by mass of alumina particles AKP-3000 (manufactured by Sumitomo Chemical Co., Ltd.) as the inorganic particle, 30 parts by mass of propylene glycol as an organic solvent, and 10 parts by mass of water. The coating ink was applied onto one of the anode composite layers with an inkjet apparatus and dried to form a first mixture layer (having a thickness of about 10 µm) of anode composite material and inorganic particle. In the same way, a first mixture layer (having a thickness of about 10 µm) of anode composite material and inorganic particle was formed on the other one of the anode composite layers.

Next, a coating ink for forming an inorganic particle layer was prepared by mixing 30 parts by mass of alumina particles AKP-3000 (manufactured by Sumitomo Chemical Co., Ltd.), 0.3 parts by mass of MALIALIM HKM-50A (manufactured by NOF CORPORATION) as a dispersant, 50 parts by mass of propylene glycol as an organic solvent, and 19.7 parts by mass of water. The coating ink was applied onto one of the first mixture layers with an inkjet apparatus and dried to form an inorganic particle layer (having a thickness of about 5 µm). In the same way, an inorganic particle layer (having a thickness of about 5 µm) was formed on the other one of the first mixture layers.

Next, a coating ink for forming a second mixture layer of inorganic particle and porous resin was prepared by mixing 20 parts by mass of alumina particles AKP-3000 (manufactured by Sumitomo Chemical Co., Ltd.) as the inorganic particle, 23.2 parts by mass of tricyclodecane dimethanol acrylate (manufactured by DAICEL-ALLNEX LTD.) as a resin, 56 parts by mass of tetradecane (manufactured by Kanto Chemical Co., Inc.) as a solvent, and 0.8 parts by mass of IRGACURE 184 (manufactured by BASF SE) as a polymerization initiator. The coating ink was applied onto one of the inorganic particle layers with an inkjet apparatus, irradiated with ultraviolet rays in an $N_2$-purge environment ($N_2$ is a polymerization inert gas), and put in a thermostatic chamber at 80 degrees C. to accelerate solvent removal and polymerization reaction. Thus, a second mixture layer of inorganic particle and porous resin (having a thickness of about 5 µm) was prepared. In the same way, a second mixture layer of inorganic particle and porous resin (having a thickness of about 5 µm) was formed on the other one of the inorganic particle layers.

Next, a coating ink for forming a porous resin layer was prepared by mixing 29 parts by mass of tricyclodecane dimethanol acrylate (manufactured by DAICEL-ALLNEX LTD.) as a resin, 70 parts by mass of tetradecane (manufactured by Kanto Chemical Co., Inc.) as a solvent, and 1 part by mass of IRGACURE 184 (manufactured by BASF SE) as a polymerization initiator. The coating ink was applied onto one of the second mixture layers with an inkjet apparatus, irradiated with ultraviolet rays in an $N_2$-purge environment ($N_2$ is a polymerization inert gas), and put in a thermostatic chamber at 80 degrees C. to accelerate solvent removal and polymerization reaction. Thus, a porous resin layer (having a thickness of about 10 µm) was prepared. In the same way, a porous resin layer (having a thickness of about 10 µm) was formed on the other one of the second mixture layers.

Thus, an electrode was prepared in which the anode composite layer, the first mixture layer of anode composite material and inorganic particle, the inorganic particle layer, the second mixture layer of inorganic particle and porous resin, and the porous layer were sequentially stacked on both sides of the anode substrate. The electrode was punched into a specific size (coated surface: 30 mm×50 mm, uncoated surface: 10 mm×11 mm) to produce an anode.

An electrode paint for forming a cathode composite layer was prepared by mixing 93 parts by mass of lithium-nickel cobalt aluminum composite oxide (NCA), 3 parts by mass of a conductive auxiliary agent, 4 parts by mass of a binder (polyvinylidene fluoride), and 100 parts by mass of N-methylpyrrolidone as a solvent. The electrode paint was applied onto both sides of a cathode substrate made of aluminum and dried to form a cathode composite layer on each side. The amount of application per unit area (area density) was 15.0 mg/cm$^2$ on each side.

The electrode was punched into a specific size (coated surface: 28 mm×48 mm, uncoated surface: 10 mm×13 mm) to produce a cathode.

The cathode was not provided with a first mixture layer of cathode composite material and inorganic particle, an inorganic particle layer, a second mixture layer of inorganic particle and porous resin, and a porous resin layer.

The above-prepared cathode and anode were alternately laminated until the lamination thickness became about 10 mm to form an electrode element. The uncoated portions of the anodes were gathered and welded with a nickel tab to form an anode lead wire, and the uncoated portions of the cathodes were gathered and welded with an aluminum tab to form a cathode lead wire. The electrode element was then made to contain a 1.5 M non-aqueous electrolyte solution of $LiPF_6$ in a mixed solvent of EC, DNC, and EMC (EC:DMC:

EMC=1:1:1) and sealed with an aluminum laminate film. Thus, a non-aqueous electrolyte power storage element was prepared. Initial Charging and Initial Capacity Measurement The cathode lead wire and the anode lead wire of the non-aqueous electrolyte power storage element as prepared above were connected to a charge/discharge test apparatus, and a constant-current constant-voltage charging was performed for 5 hours at a maximum voltage of 4.2 V and a current rate of 0.2 C. After completion of the charging, the non-aqueous electrolyte power storage element was left to stand in a thermostatic chamber at 40 degrees C. for 5 days. After that, a constant-current discharging was performed to 2.5 V at a current rate of 0.2 C. After that, a constant-current constant-voltage charging was performed for 5 hours at a maximum voltage of 4.2 V and a current rate of 0.2 C, followed by a pause for 10 minutes, and then a constant-current discharging was performed to 2.5 V at a current rate of 0.2 C. The discharge capacity at this time was defined as the initial capacity.

Output Density Evaluation Test: Evaluation 3

The cathode lead wire and the anode lead wire of the non-aqueous electrolyte power storage element whose initial capacity had been measured as above were connected to a charge/discharge test apparatus, and a charging was performed for 5 hours at a maximum voltage of 4.2 V and a current rate of 0.2 C. After a pause for 10 minutes, a constant-current discharging was performed for 2.5 hours at a current rate of 0.2 C to make the charging depth of the non-aqueous electrolyte power storage element be 50%. Next, a pulse with a current rate of from 1 to 10 C was discharged for 10 seconds, a power for the 2.5 V cutoff voltage was calculated from the correlation line between the post-pulse voltage and the current value, and the output density (Wh/kg) was calculated by division with the cell weight. As a result, the output density was 3,150 Wh/kg.

Lifespan Evaluation Test: Evaluation 4

The cathode lead wire and the anode lead wire of the non-aqueous electrolyte power storage element whose initial capacity had been measured as above were connected to a charge/discharge test apparatus, and a constant-current constant-voltage charging was performed for 3 hours at a maximum voltage of 4.2 V and a current rate of 1 C. After completion of the charging, a constant-current discharging was performed to 2.5 V at a current rate of 1 C. This procedure was repeated 1,000 cycles with interposing a 10-minute pause.

After completion of the cycles, a constant-current constant-voltage charging was performed for 5 hours at a maximum voltage of 4.2 V and a current rate of 0.2 C, followed by a pause for 10 minutes, and then a constant-current discharging was performed to 2.5 V at a current rate of 0.2 C. The discharge capacity at this time was defined as the post-cycle discharge capacity, and the cycle capacity retention ratio (post-cycle discharge capacity/initial discharge capacity×100) was calculated.

The results were evaluated according to the following evaluation criteria.

Evaluation Criteria

Good: The discharge capacity at 0.2 C after 1,000 cycles is 80% or more of the initial discharge capacity at 0.2 C.

Poor: The discharge capacity at 0.2 C after 1,000 cycles is less than 80% of the initial discharge capacity at 0.2 C.

Safety Evaluation Test: Evaluation 5

The cathode lead wire and the anode lead wire of the non-aqueous electrolyte power storage element whose initial capacity had been measured as above were connected to a charge/discharge test apparatus, and a constant-current constant-voltage charging was performed for 3 hours at a maximum voltage of 4.2 V and a current rate of 1 C to make the charging depth be 100% (full-charged). Next, the non-aqueous electrolyte power storage element was pierced with a nail having a diameter of 4.5 mm in a direction parallel to the direction of lamination of the electrodes to intentionally cause a short circuit, and the state thereof was observed. The observation results were evaluated according to the following evaluation criteria.

Evaluation Criteria

Good: No ignition observed.

Poor: Ignition observed.

Example 23

An anode and a cathode were prepared in the same manner as in Example 22 except that the film thickness of the second mixture layer of inorganic particle and porous resin was changed to 15 μm and the porous resin layer was not formed. A non-aqueous electrolyte power storage element was then prepared in the same manner as in Example 22, and Evaluations 3 to 5 were performed.

Example 24

An anode and a cathode were prepared in the same manner as in Example 22 except that the film thickness of the first mixture layer of anode composite material and inorganic particle formed on the anode was changed to 5 μm. A non-aqueous electrolyte power storage element was then prepared in the same manner as in Example 22, and Evaluations 3 to 5 were performed.

Example 25

An anode and a cathode were prepared in the same manner as in Example 22 except that the film thickness of the inorganic particle layer on the anode was changed to 25 m and the second mixture layer of inorganic particle and porous resin was not formed. A non-aqueous electrolyte power storage element was then prepared in the same manner as in Example 22, and Evaluations 3 to 5 were performed.

Example 26

An anode and a cathode were prepared in the same manner as in Example 22 except that the film thickness of the porous resin layer on the anode was changed to 50 μm. A non-aqueous electrolyte power storage element was then prepared in the same manner as in Example 22, and Evaluations 3 to 5 were performed.

Comparative Example 7

An anode and a cathode were prepared in the same manner as in Example 22 except that a polyolefin separator having a film thickness of 20 μm was provided between the anode and the cathode and that the anode was provided only with an anode composite layer and not provided with any of a first mixture layer of anode composite material and inorganic particle, an inorganic particle layer, a second mixture layer of inorganic particle and porous resin, and a porous resin layer. A non-aqueous electrolyte power storage element was then prepared in the same manner as in Example 22, and Evaluations 3 to 5 were performed.

Comparative Example 8

An anode and a cathode were prepared in the same manner as in Example 22 except that the first mixture layer of anode composite material and inorganic particle provided was not formed on the anode. A non-aqueous electrolyte power storage element was then prepared in the same manner as in Example 22, and Evaluations 3 to 5 were performed.

Comparative Example 9

An anode and a cathode were prepared in the same manner as in Example 22 except that the inorganic particle layer was not formed on the anode and the film thickness of the porous resin layer was changed to 15 μm. A non-aqueous electrolyte power storage element was then prepared in the same manner as in Example 22, and Evaluations 3 to 5 were performed.

Comparative Example 10

An anode and a cathode were prepared in the same manner as in Example 22 except that the second mixture layer of inorganic particle and porous resin was not formed on the anode and the film thickness of the porous resin layer was changed to 15 μm. A non-aqueous electrolyte power storage element was then prepared in the same manner as in Example 22, and Evaluations 3 to 5 were performed.

Comparative Example 11

An anode and a cathode were prepared in the same manner as in Example 22 except that the first mixture layer of anode composite material and inorganic particle, the inorganic particle layer, and the second mixture layer of inorganic particle and porous resin were not formed on the anode and the film thickness of the porous resin layer was changed to 0.5 μm. A non-aqueous electrolyte power storage element was then prepared in the same manner as in Example 22 and an initial charging was performed. As a result, the charging was not normally completed due to the occurrence of a short circuit.

Comparative Example 12

An anode and a cathode were prepared in the same manner as in Example 22 except that the film thickness of the porous resin layer on the anode was changed to 150 μm. A non-aqueous electrolyte power storage element was then prepared in the same manner as in Example 22, and Evaluations 3 to 5 were performed.

The thickness of each layer in Examples and Comparative Examples are shown in Table 1. In Table 1, "NONE" indicates that the corresponding layer is not formed. The evaluation results of Examples and Comparative Examples are shown in Table 2.

TABLE 1

|  | FILM THICKNESS OF MIXTURE LAYER OF ANODE COMPOSITE MATERIAL AND INORGANIC PARTICLE | FILM THICKNESS OF INORGANIC PARTICLE LAYER | FILM THICKNESS OF MIXTURE LAYER OF INORGANIC PARTICLE AND POROUS RESIN | FILM THICKNESS OF POROUS RESIN LAYER |
|---|---|---|---|---|
| EXAMPLE 22 | 10 μm | 5 μm | 5 μm | 10 μm |
| EXAMPLE 23 | 10 μm | 5 μm | 15 μm | NONE |
| EXAMPLE 24 | 5 μm | 5 μm | 5 μm | 10 μm |
| EXAMPLE 25 | 10 μm | 25 μm | NONE | NONE |
| EXAMPLE 26 | 10 μm | 5 μm | 5 μm | 50 μm |
| COMPARATIVE EXAMPLE 7 | NONE | NONE | NONE | NONE |
| COMPARATIVE EXAMPLE 8 | NONE | 5 μm | 5 μm | 10 μm |
| COMPARATIVE EXAMPLE 9 | 10 μm | NONE | 5 μm | 15 μm |
| COMPARATIVE EXAMPLE 10 | 10 μm | 5 μm | NONE | 15 μm |
| COMPARATIVE EXAMPLE 11 | NONE | NONE | NONE | 0.5 μm |
| COMPARATIVE EXAMPLE 12 | 10 μm | 5 μm | 5 μm | 150 μm |

TABLE 2

|  | EVALUATION 3: OUTPUT DENSITY | EVALUATION 4: LIFESPAN | EVALUATION 5: SAFETY |
|---|---|---|---|
| EXAMPLE 22 | 3150 Wh/kg | GOOD | GOOD |
| EXAMPLE 23 | 3300 Wh/kg | GOOD | GOOD |
| EXAMPLE 24 | 3150 Wh/kg | GOOD | GOOD |
| EXAMPLE 25 | 2800 Wh/kg | GOOD | GOOD |
| EXAMPLE 26 | 2800 Wh/kg | GOOD | GOOD |
| COMPARATIVE EXAMPLE 7 | 2700 Wh/kg | POOR | POOR |
| COMPARATIVE EXAMPLE 8 | 3150 Wh/kg | POOR | GOOD |
| COMPARATIVE EXAMPLE 9 | 3150 Wh/kg | GOOD | POOR |
| COMPARATIVE EXAMPLE 10 | 2700 Wh/kg | GOOD | GOOD |
| COMPARATIVE EXAMPLE 11 | CELL SHORT CIRCUIT | | |
| COMPARATIVE EXAMPLE 12 | 2500 Wh/kg | GOOD | GOOD |

Comparison of Comparative Example 7 with Example 22

The results of Evaluation 3 indicate that the output density of the non-aqueous electrolyte power storage elements of Example 22 and Comparative Example 7 were 3,150 Wh/kg and 2,700 Wh/kg, respectively. The results of Evaluation 4 for Example 22 and Comparative Example 7 were "Good" and "Poor", respectively. The results of Evaluation 5 for Example 22 and Comparative Example 7 were "Good" and "Poor", respectively.

The difference between the non-aqueous electrolyte power storage elements of Example 22 and Comparative Example 7 is the presence or absence of the first mixture layer of anode composite material and inorganic particle on the anode composite layer. It was confirmed that, when the first mixture layer of anode composite material and inorganic particle was provided on the anode composite layer as in Example 22, deposition of lithium was prevented in the vicinity of the surface of the anode composite layer and the life characteristics were improved.

Another difference between the non-aqueous electrolyte power storage elements of Example 22 and Comparative Example 7 is the presence or absence of the inorganic particle layer. It was confirmed that the presence of the inorganic particle layer improved the safety as in Example 22.

Another difference between the non-aqueous electrolyte power storage elements of Example 22 and Comparative Example 7 is the presence or absence of the second mixture layer of inorganic particle and porous resin. In each of the non-aqueous electrolyte power storage elements of Example 22 and Comparative Example 7, the film thickness of the insulating layer (corresponding to the entire of the inorganic particle layer, the second mixture layer of inorganic particle and porous resin, and the porous resin layer in Example 22, and corresponding to the polyolefin separator in Comparative Example 7) disposed between the anode and the cathode is the same, i.e., m. In Example 22, it was confirmed that the presence of the second mixture layer of inorganic particle and porous resin improved ionic conductivity in the porous resin, and as a result, the output characteristics were improved.

Results for Example 23

For the non-aqueous electrolyte power storage elements of Example 23, the result of Evaluation 3 indicates that the output density was 3,300 Wh/kg, the result of Evaluation 4 was "Good", and the result of Evaluation 5 was "Good". The output density was more improved than in Example 22. Instead of providing the porous resin layer, the film thickness of the second mixture layer of inorganic particle and porous resin was increased than in Example 22. At the same time, the total film thickness of the inorganic particle layer and the second mixture layer of inorganic particle and porous resin in Example 23 was made equal to the total film thickness of the inorganic particle layer, the second mixture layer of inorganic particle and porous resin, and the porous resin layer in Example 22.

Comparing the results of Evaluation 3, the output density in Example 22 and Example 23 were 3,150 Wh/kg and 3,300 Wh/kg, respectively. It was confirmed that, when the film thickness of the second mixture layer of inorganic particle and porous resin was increased as in Example 23, ionic conductivity in the porous resin was improved, and as a result, the output characteristics were improved.

Results for Example 24

In the non-aqueous electrolyte power storage element of Example 24, the film thickness of the first mixture layer of anode composite material and inorganic particles was 5 μm. In Example 24, the result of Evaluation 4 was "Good". It was confirmed that the life characteristics were improved as compared with Comparative Example 7 in which the first mixture layer of anode composite material and inorganic particle was not provided.

Results for Example 25

In Example 25, only an inorganic particle layer having a film thickness of 25 μm was provided on the first mixture layer of the anode to prevent a short circuit between the cathode and the anode. This non-aqueous electrolyte power storage element normally functioned because a short circuit between the cathode and the anode was prevented. It was confirmed that the non-aqueous electrolyte power storage element normally functioned as long as the first mixture layer and the inorganic particle layer were provided even when the second mixture layer and the porous resin layer were not provided.

Results for Example 26

In the non-aqueous electrolyte power storage element of Example 26, the film thickness of the porous resin layer is 50 μm, which is larger than that in Example 22. However, the result of Evaluation 3 indicates that the output density was 2,800 Wh/kg, which indicates good output characteristics.

Results for Comparative Example 8

In the non-aqueous electrolyte power storage element of Comparative Example 8, the first mixture layer of anode composite material and inorganic particle was not provided. The result of Evaluation 4 was "Poor", which indicates that the lifespan was inferior to Examples 22 to 26 in which the anode composite layer and the inorganic particle layer were provided.

Results for Comparative Example 9

In the non-aqueous electrolyte power storage element of Comparative Example 9, the inorganic particle layer was not provided. The result of Evaluation 5 was "Poor", which indicates that the safety was inferior to Examples 22 to 26 in which the inorganic particle layer was provided.

Results for Comparative Example 10

In the non-aqueous electrolyte power storage element of Comparative Example 10, the second mixture layer of inorganic particle and porous resin was not provided. The result of Evaluation 3 indicates that the output density was 2,700 Wh/kg, which indicates that the output density characteristics were inferior to Examples 22 to 24 in which the second mixture layer of inorganic particle and porous resin were provided.

Results for Comparative Example 11

In the non-aqueous electrolyte power storage element of Comparative Example 11, only a porous resin layer having a film thickness of 0.5 μm was provided on the anode. As a result of performing an initial charging, the non-aqueous electrolyte power storage element was not normally charged due to the occurrence of a short circuit. This is because the film thickness of the porous resin layer was too small and the distance between the anode and the cathode was too small to prevent the occurrence of a short circuit.

Comparison of Comparative Example 22 with Example 12

In the non-aqueous electrolyte power storage element of Comparative Example 12, the film thickness of the porous resin layer is 150 μm, which is larger than that in Example 22. The results of Evaluation 3 indicate that the output density of Comparative Example 12 and Example 22 were 2,500 Wh/kg and 3,150 Wh/kg, respectively. This indicates that Comparative Example 12, in which the distance between the anode and the cathode was large, were inferior to Examples 22 in output density characteristics.

The preferred embodiments have been described in detail above. However, the present invention is not limited to the above-described embodiments, and various modifications and substitutions can be made to the above-described embodiments without departing from the scope of the claims.

For example, the anode 17 is not limited to be used for the non-aqueous electrolyte power storage elements described above, and can also be used for a power storage element using a gel electrolyte. In either case, the same effect is exerted.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

This patent application is based on and claims priority to Japanese Patent Application Nos. 2018-211764 and 2019-145603, filed on Nov. 9, 2018 and Aug. 7, 2019, respectively, in the Japan Patent Office, the entire disclosure of each of which is hereby incorporated by reference herein.

REFERENCE SIGNS LIST 1, 1A, 1B, 1C, 1D Non-aqueous electrolyte power storage element
10, 10A, 17, 17A, 17B, 17C Anode
11 Anode substrate
12 Anode composite layer
13 Inorganic particle layer
14, 15 Mixture layer
16 Porous resin layer
20, 27 Cathode
21 Cathode substrate
22 Cathode composite layer
30 Separator
40, 40A, 40B, 40C, 40D Electrode element
41 Anode lead wire
42 Cathode lead wire
51 Electrolyte layer
52 Exterior
60 Core-shell structure
61 Inorganic particle
62 Polymer

The invention claimed is:
1. An electrode, comprising:
an electrode substrate;
an electrode composite layer overlying the electrode substrate; and
an inorganic particle layer overlying the electrode composite layer;
a first mixture layer overlying the electrode composite layer and underlying the inorganic particle layer, the first mixture layer comprising:
an electrode composite material;
an inorganic particle (i) being insulating and having a surface potential; and
a polymer (i) having an ionic functional group (A) and an ion-conducting functional group (B) each charged opposite to the surface potential of the inorganic particle (i:
wherein said inorganic particle layer comprises:
an inorganic particle (ii) being insulating and having a surface potential; and
a polymer (ii) having an ionic functional group (A) and an ion-conducting functional group (B) each charged opposite to the surface potential of the inorganic particle (ii),
wherein the inorganic particle (ii) of said inorganic particle layer and the polymer (ii) are bonded to each other.

2. The electrode according to claim 1, wherein a film thickness of the first mixture layer is from 1% to 20% of that of the electrode composite layer.

3. The electrode according to claim 1, further comprising: a second mixture layer overlying the inorganic particle layer, the second mixture layer containing an inorganic particle iii) and a porous resin.

4. The electrode according to claim 3, wherein the inorganic particle iii contained in the second mixture layer comprises at least one element selected from silicon element, aluminum element, and zirconium element.

5. The electrode according to claim 3, wherein the second mixture layer has a film thickness of from 0.1 µm to 100 µm.

6. The electrode according to claim 3, wherein the second mixture layer has a porosity of from 30% to 80%.

7. The electrode according to claim 3, further comprising: a porous resin layer overlying the second mixture layer.

8. The electrode according to claim 7, wherein the porous resin layer has a film thickness of from 0.1 µm to 100 µm.

9. The electrode according to claim 7, wherein the porous resin layer has a porosity of from 40% to 90%.

10. The electrode according to claim 7, wherein a total film thickness of the inorganic particle layer, the second mixture layer, and the porous resin layer is from 1 µm to 100 µm.

11. The electrode according to claim 1, wherein the inorganic particle (ii) and the polymer (jj) form a core-shell structure.

12. The electrode according to claim 1, wherein the inorganic particle (ii) comprises an alumina particle.

13. The electrode according to claim 12, wherein the ionic functional group (A) in said inorganic particle layer is an anionic functional group.

14. The electrode according to claim 13, wherein the anionic functional group comprises at least one of a sulfonic acid group, a carboxylic acid group, and a phosphoric acid group.

15. The electrode according to claim 1, wherein the ion-conducting functional group (B) of said inorganic particle layer is a polyoxyalkylene chain.

16. The electrode according to claim 1, wherein said inorganic particle layer further comprises a resin,
wherein a proportion of the resin to the inorganic particle (ii) is from 0.5% to 5% by mass,
wherein a proportion of the polymer (jj) to the resin is from 40% to 100% by mass.

17. The electrode according to claim 1, wherein a resistance per unit area of the inorganic particle layer is from 0.01 to 1.0 $\Omega \cdot cm^2$.

* * * * *